United States Patent
Malladi et al.

(10) Patent No.: US 11,582,749 B2
(45) Date of Patent: Feb. 14, 2023

(54) CELL DISCOVERY IN A WIRELESS NETWORK USING AN UNLICENSED RADIO FREQUENCY SPECTRUM BAND

(71) Applicant: QUALCOMM Incorporated, San Diego, CA (US)

(72) Inventors: Durga Prasad Malladi, San Diego, CA (US); Tao Luo, San Diego, CA (US); Aleksandar Damnjanovic, Del Mar, CA (US); Yongbin Wei, La Jolla, CA (US); Madhavan Srinivasan Vajapeyam, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 14/789,301

(22) Filed: Jul. 1, 2015

(65) Prior Publication Data

US 2016/0007353 A1 Jan. 7, 2016

Related U.S. Application Data

(60) Provisional application No. 62/020,897, filed on Jul. 3, 2014.

(51) Int. Cl.
*H04W 72/04* (2009.01)
*H04W 48/16* (2009.01)
(Continued)

(52) U.S. Cl.
CPC ....... *H04W 72/0453* (2013.01); *H04L 5/0053* (2013.01); *H04W 48/16* (2013.01); *H04W 48/12* (2013.01); *H04W 48/20* (2013.01)

(58) Field of Classification Search
USPC ........................................................ 370/329
See application file for complete search history.

(56) References Cited

U.S. PATENT DOCUMENTS

| 2007/0260851 A1* | 11/2007 | Taha | H04W 52/0229 |
| | | | 712/204 |
| 2011/0256868 A1* | 10/2011 | Nogami | H04J 11/0069 |
| | | | 455/435.1 |

(Continued)

FOREIGN PATENT DOCUMENTS

| CN | 103168491 A | 6/2013 |
| CN | 103765824 A | 4/2014 |

(Continued)

OTHER PUBLICATIONS

ISA/EPO, International Search Report and Written Opinion of the International Searching Authority, Int'l. App. No. PCT/US2015/038946, dated Oct. 9, 2015, European Patent Office, Rijswijk, NL, 12 pgs.

*Primary Examiner* — Gregory B Sefcheck
*Assistant Examiner* — Majid Esmaeilian
(74) *Attorney, Agent, or Firm* — Holland & Hart LLP

(57) ABSTRACT

Techniques for transmitting and receiving wireless communications over an unlicensed radio frequency spectrum band are disclosed, including techniques for transmitting and receiving service information blocks over the unlicensed radio frequency spectrum band, techniques for gaining access to the unlicensed radio frequency spectrum band by performing extended clear channel assessments (eCCAs), techniques for transmitting and receiving synchronization signals and reference signals over the unlicensed radio frequency spectrum band, techniques for communicating locations of reference signals, and techniques for communicating availability of certain resources to be combined across multiple different transmissions.

22 Claims, 15 Drawing Sheets

(51) Int. Cl.
   *H04L 5/00*    (2006.01)
   *H04W 48/20*   (2009.01)
   *H04W 48/12*   (2009.01)

(56) References Cited

U.S. PATENT DOCUMENTS

| | | | | |
|---|---|---|---|---|
| 2011/0268101 A1* | 11/2011 | Wang | ............ | H04L 5/0053 370/344 |
| 2012/0039284 A1 | 2/2012 | Barbieri et al. | | |
| 2012/0063373 A1 | 3/2012 | Chincholi et al. | | |
| 2012/0322453 A1* | 12/2012 | Weng | ............ | H04W 72/02 455/450 |
| 2012/0327895 A1* | 12/2012 | Wallen | ............ | H04W 48/12 370/329 |
| 2013/0155991 A1* | 6/2013 | Kazmi | ............ | H04W 72/0453 370/329 |
| 2013/0188531 A1* | 7/2013 | Zhang | ............ | H04L 5/0007 370/280 |
| 2013/0195073 A1 | 8/2013 | Chen et al. | | |
| 2014/0128085 A1* | 5/2014 | Charbit | ............ | H04L 5/00 455/450 |
| 2014/0302867 A1* | 10/2014 | Mizusawa | ............ | H04W 16/16 455/452.1 |
| 2014/0341018 A1* | 11/2014 | Bhushan | ............ | H04W 28/0289 370/230 |
| 2015/0009910 A1* | 1/2015 | Ryu | ............ | H04W 72/12 370/329 |
| 2015/0085769 A1* | 3/2015 | Parkvall | ............ | H04W 52/18 370/329 |
| 2015/0139113 A1* | 5/2015 | You | ............ | H04L 5/003 370/329 |
| 2015/0173054 A1 | 6/2015 | Ohta et al. | | |
| 2015/0181575 A1* | 6/2015 | Ng | ............ | H04L 5/0092 370/329 |
| 2015/0189574 A1* | 7/2015 | Ng | ............ | H04W 24/08 370/252 |
| 2015/0208394 A1* | 7/2015 | Seo | ............ | H04L 5/0053 370/329 |
| 2015/0282128 A1* | 10/2015 | Cui | ............ | H04L 5/0094 370/329 |
| 2015/0365880 A1* | 12/2015 | Malladi | ............ | H04W 48/12 370/312 |
| 2016/0043849 A1* | 2/2016 | Lee | ............ | H04L 5/0053 370/329 |
| 2016/0112172 A1* | 4/2016 | Seo | ............ | H04L 5/0053 370/329 |
| 2016/0174261 A1* | 6/2016 | Yang | ............ | H04L 69/22 370/329 |
| 2016/0254920 A1* | 9/2016 | Davydov | ............ | H04B 7/0413 370/312 |

FOREIGN PATENT DOCUMENTS

| | | |
|---|---|---|
| WO | WO-2013006988 A1 | 1/2013 |
| WO | WO-2013063808 A1 | 5/2013 |
| WO | WO-2014045322 A1 | 3/2014 |

* cited by examiner

CELL DISCOVERY IN A WIRELESS NETWORK USING AN UNLICENSED RADIO FREQUENCY SPECTRUM BAND

CROSS REFERENCES

The present Application for Patent claims priority to U.S. Provisional Patent Application No. 62/020,897 by Malladi et al., entitled "Cell Discovery in a Wireless Network Using an Unlicensed Radio Frequency Spectrum Band," filed Jul. 3, 2014, assigned to the assignee hereof, and expressly incorporated by reference herein.

BACKGROUND

1. Field of the Disclosure

The present disclosure, for example, relates to wireless communication systems, and more particularly to cell discovery in systems operating in an unlicensed radio frequency spectrum band.

2. Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple wireless devices (e.g., mobile phones or tablet computers). A base station may communicate with wireless devices on downlink channels (e.g., for transmissions from the base station to the wireless devices) and uplink channels (e.g., for transmissions from the wireless devices to the base station).

Some modes of communication may enable communications with a UE over different radio frequency spectrum bands (e.g., a licensed radio frequency spectrum band or an unlicensed radio frequency spectrum band) of a cellular network. With increasing data traffic in cellular networks that use licensed radio frequency spectrum bands, offloading at least some data traffic to an unlicensed radio frequency spectrum band may provide a cellular operator with opportunities for enhanced data transmission capacity. Prior to gaining access to, and communicating over, the unlicensed radio frequency spectrum band, a device, may perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. If it is determined that the channel of the unlicensed radio frequency spectrum band is not available (e.g., because another device is already using the channel of the unlicensed radio frequency spectrum band), a CCA may be performed for the channel again at a later time. If the channel is available, the device may begin to transmit data using the channel. Data transmissions may include control channel information that may be used for identifying a cell and for determining timing and other parameters of the cell.

SUMMARY

The present disclosure, for example, relates to wireless communications over an unlicensed radio frequency spectrum band, including techniques for communicating a location of system information within a radio frame and for indicating that multiple different transmissions may be combined prior to decoding information from the transmissions. Such information may be used in, for example, cell discovery to determine timing and various parameter information for a cell transmitting in the unlicensed radio frequency spectrum band. The information, in some examples, may be obtained without assistance from an associated cell transmitting an anchor carrier over a licensed radio frequency spectrum band.

In some examples, a system information block (SIB) may be generated and transmitted via a control channel over an unlicensed radio frequency spectrum band. One or more reference signals may be transmitted that indicate a portion of the control channel that includes the SIB, that a receiver may use to decode the SIB and obtain information related to the transmitter of the SIB. In some examples, a SIB may be transmitted in multiple different transmissions prior to being changed and transmitted again in multiple different transmissions. In some examples, an indication is transmitted to indicate that multiple of the SIB transmissions may be combined by a receiver to enhance the likelihood of successful reception and decoding of the SIB.

According to a first set of examples, a method of wireless communication is described, the method including generating a system information block (SIB) comprising a plurality of parameters related to a base station; transmitting the SIB via a control channel over an unlicensed radio frequency spectrum band; and transmitting a reference signal indicating a portion of the control channel that includes the SIB.

According to the first set of examples, an apparatus for wireless communication is described, the apparatus including means for generating a system information block (SIB) comprising a plurality of parameters related to a base station; means for transmitting the SIB via a control channel over an unlicensed radio frequency spectrum band; and means for transmitting a reference signal indicating a portion of the control channel that includes the SIB.

According to the first set of examples, an apparatus for wireless communication is described, the apparatus including a processor, memory in electronic communication with the processor, and instructions stored in the memory. The instructions may be executable by the processor to generate a system information block (SIB) comprising a plurality of parameters related to a base station; transmit the SIB via a control channel over an unlicensed radio frequency spectrum band; and transmit a reference signal indicating a portion of the control channel that includes the SIB.

According to the first set of examples, a non-transitory computer-readable medium is described, the non-transitory computer-readable medium storing code for wireless communication, the code including instructions executable by a processor to generate a system information block (SIB) comprising a plurality of parameters related to a base station; transmit the SIB via a control channel over an unlicensed radio frequency spectrum band; and transmit a reference signal indicating a portion of the control channel that includes the SIB.

In some aspects of the method, apparatuses, or non-transitory computer-readable medium of the first set of examples, the control channel may include a plurality of resource blocks, and the reference signal may indicate a subset of the plurality of resource blocks that include the SIB. In certain examples, the reference signal may include a physical cell identity (PCI), and the subset of the plurality of resource blocks are mapped to the PCI. In some examples, the subset of the plurality of resource blocks may be predetermined based on a timing of the reference signal. In other examples, the reference signal may include information indicating a location of the subset of resource blocks.

In some aspects of the method, apparatuses, or non-transitory computer-readable medium of the first set of examples, the SIB may be transmitted over the unlicensed radio frequency spectrum band during a clear channel assessment (CCA)-exempt transmission (CET) subframe associated with the base station. The CCA may be performed, for example, prior to a non-CET subframe associated with opportunistic system information block transmissions, and the SIB may be transmitted on the non-CET subframe when the CCA is successful.

In some aspects of the method, apparatuses, or non-transitory computer-readable medium of the first set of examples, the parameters may include a system frame number (SFN). The reference signal may be transmitted, in some examples, with a periodicity that exceeds a length of a radio frame, that may, for example, correspond to a time period for incrementing the SFN.

According to a second set of examples, a method of wireless communication is described that includes generating, at a base station, a system information block (SIB) comprising a sequence frame number (SFN) for use in decoding a plurality of data transmissions from the base station; transmitting the SIB on a plurality of SIB transmissions over an unlicensed radio frequency spectrum band; and transmitting an indication that two or more of the SIB transmissions can be combined to decode the SIB.

According to the second set of examples, an apparatus of wireless communication is described, the apparatus including means for generating, at a base station, a system information block (SIB) comprising a sequence frame number (SFN) for use in decoding a plurality of data transmissions from the base station; means for transmitting the SIB on a plurality of SIB transmissions over an unlicensed radio frequency spectrum band; and means for transmitting an indication that two or more of the SIB transmissions can be combined to decode the SIB.

According to the second set of examples, an apparatus for wireless communication is described, the apparatus including a processor, memory in electronic communication with the processor, and instructions stored in the memory. The instructions may be executable by the processor to generate, at a base station, a system information block (SIB) comprising a sequence frame number (SFN) for use in decoding a plurality of data transmissions from the base station; transmit the SIB on a plurality of SIB transmissions over an unlicensed radio frequency spectrum band; and transmit an indication that two or more of the SIB transmissions can be combined to decode the SIB.

According to the second set of examples, a non-transitory computer-readable medium is described, the computer-readable medium storing code for wireless communication, the code including instructions executable by a processor to generate, at a base station, a system information block (SIB) comprising a sequence frame number (SFN) for use in decoding a plurality of data transmissions from the base station; transmit the SIB on a plurality of SIB transmissions over an unlicensed radio frequency spectrum band; and transmit an indication that two or more of the SIB transmissions can be combined to decode the SIB.

In some aspects of the method, apparatuses, or non-transitory computer-readable medium of the second set of examples, the transmission of the indication that two or more of the SIB transmissions can be combined may include determining a periodicity for incrementing the SFN; determining a time within the periodicity for each of the SIB transmissions; and transmitting, for each of the SIB transmissions, a value indicating the time within the periodicity of the associated SIB transmission. The value may include, for example, a redundancy version value that indicates the time within the periodicity for each of the SIB transmissions. In some examples, the SIB transmissions are uniformly spaced in time.

In some aspects of the method, apparatuses, or non-transitory computer-readable medium of the second set of examples, transmitting the indication that two or more of the SIB transmissions can be combined may include determining a periodicity for incrementing the SFN; setting a reference signal periodicity to correspond to the periodicity for incrementing the SFN; and transmitting the reference signal during a same subframe as a first SIB transmission following an increment of the SFN. The periodic transmissions of the SIB may be, in some examples, non-uniformly spaced in time.

In some aspects of the method, apparatuses, or non-transitory computer-readable medium of the second set of examples, transmitting the indication that two or more of the SIB transmissions can be combined may include determining a periodicity for incrementing the SFN; and transmitting, for each of the SIB transmissions, a value indicating the time within the periodicity of the associated SIB transmission. The indication may include, for example, a redundancy version value that indicates a radio frame number associated with each of the SIB transmissions. In some examples, the indication may include the time of transmission of a first SIB transmission following an increment of the SFN. The SIB transmissions may be, in some examples, non-uniformly spaced in time.

In some aspects of the method, apparatuses, or non-transitory computer-readable medium of the second set of examples, transmitting the indication that two or more of the SIB transmissions can be combined may include determining a periodicity for incrementing the SFN; and transmitting, during a period for transmitting a channel usage beacon signal (CUBS), a value indicating a timing for incrementing the SFN. The value indicating the timing for incrementing the SFN may be transmitted in a CUBS transmission, for example. In some examples, the value indicating the timing for incrementing the SFN is transmitted in a control channel transmission present in a same symbol as a CUBS transmission. The SIB transmissions may be, in some examples, non-uniformly spaced in time.

According to a third set of examples, a method of wireless communication is described, the method including receiving a reference signal over an unlicensed radio frequency spectrum band, the reference signal indicating a portion of a control channel that includes a system information block (SIB), the SIB comprising a plurality of parameters related to a base station; receiving the control channel; and decoding the SIB based on the indicated portion of the control channel that includes the SIB.

According to the third set of examples, an apparatus of wireless communication is described, the apparatus including means for receiving a reference signal over an unlicensed radio frequency spectrum band, the reference signal indicating a portion of a control channel that includes a system information block (SIB), the SIB comprising a plurality of parameters related to a base station; means for receiving the control channel; and means for decoding the SIB based on the indicated portion of the control channel that includes the SIB.

According to the third set of examples, an apparatus for wireless communication is described, the apparatus including a processor, memory in electronic communication with the processor, and instructions stored in the memory, the instructions being executable by the processor to: receive a reference signal over an unlicensed radio frequency spectrum band, the reference signal indicating a portion of a control channel that includes a system information block (SIB), the SIB comprising a plurality of parameters related to a base station; receive the control channel; and decode the SIB based on the indicated portion of the control channel that includes the SIB.

According to the third set of examples, a non-transitory computer-readable medium is described, the computer-readable medium storing code for wireless communication, the code comprising instructions executable by a processor to: receive a reference signal over an unlicensed radio frequency spectrum band, the reference signal indicating a portion of a control channel that includes a system information block (SIB), the SIB comprising a plurality of parameters related to a base station; receive the control channel; and decode the SIB based on the indicated portion of the control channel that includes the SIB.

In some aspects of the method, apparatuses, or non-transitory computer-readable medium of the third set of examples, the control channel may include a plurality of resource blocks, and wherein the reference signal indicates a subset of the plurality of resource blocks that include the SIB. The reference signal may include, for example, a physical cell identity (PCI), and wherein the subset of the plurality of resource blocks are mapped to the PCI. The reference signal may, in some examples, include information indicating a location of the subset of resource blocks. In some examples, the parameters may include a system frame number (SFN). The reference signal may be transmitted with a periodicity that exceeds a length of a radio frame that may, in some examples, correspond to a time period for incrementing the SFN. In some examples, the decoding may include combining a plurality of resource blocks including a plurality of transmissions of the SIB; and decoding the combined resource blocks to generate the SIB.

According to a fourth set of examples, a method of wireless communication is described, the method including receiving an indication that two or more received transmissions can be combined to decode a system information block (SIB) comprising a sequence frame number (SFN) for use in decoding a plurality of data transmissions from a base station; combining the two or more received transmissions; and decoding the SIB based on the combined transmissions.

According to the fourth set of examples, an apparatus of wireless communication is described, the apparatus including means for receiving an indication that two or more received transmissions can be combined to decode a system information block (SIB) comprising a sequence frame number (SFN) for use in decoding a plurality of data transmissions from a base station; means for combining the two or more received transmissions; and means for decoding the SIB based on the combined transmissions.

According to the fourth set of examples, an apparatus for wireless communication is described, the apparatus including a processor, memory in electronic communication with the processor, and instructions stored in the memory, the instructions being executable by the processor to: receive an indication that two or more received transmissions can be combined to decode a system information block (SIB) comprising a sequence frame number (SFN) for use in decoding a plurality of data transmissions from a base station; combine the two or more received transmissions; and decode the SIB based on the combined transmissions.

According to the fourth set of examples, a non-transitory computer-readable medium is described, the computer-readable medium storing code for wireless communication, the code comprising instructions executable by a processor to: receive an indication that two or more received transmissions can be combined to decode a system information block (SIB) comprising a sequence frame number (SFN) for use in decoding a plurality of data transmissions from a base station; combine the two or more received transmissions; and decode the SIB based on the combined transmissions.

Some aspects of the method, apparatuses, or non-transitory computer-readable medium of the fourth set of examples may also include determining a periodicity for incrementing the SFN; and the indication that two or more received transmissions can be combined comprises, for each of the SIB transmissions, a value indicating the time within the periodicity of the associated SIB transmission. The value may include, for example, a redundancy version value that indicates the time within the periodicity for each of the SIB transmissions. The SIB transmissions may be, in some examples, uniformly spaced in time.

In some aspects of the method, apparatuses, or non-transitory computer-readable medium of the fourth set of examples, receiving the indication that two or more of the SIB transmissions can be combined may include receiving a reference signal having a periodicity corresponding to a periodicity for incrementing the SFN. The periodic transmissions of the SIB may be, in some examples, non-uniformly spaced in time.

In some aspects of the method, apparatuses, or non-transitory computer-readable medium of the fourth set of examples, receiving the indication that two or more of the SIB transmissions can be combined may include receiving, for each of the SIB transmissions, a value indicating the time of the associated SIB transmission within a periodicity for incrementing the SFN. In some examples, the indication may include a redundancy version value that indicates a radio frame number associated with each of the SIB transmissions. In certain examples, the indication may include the time of transmission of a first SIB transmission following an increment of the SFN. The SIB transmissions may be, in some examples, non-uniformly spaced in time.

In some aspects of the method, apparatuses, or non-transitory computer-readable medium of the fourth set of examples, receiving the indication that two or more of the SIB transmissions can be combined may include receiving, during a period for transmitting a channel usage beacon signal (CUBS), a value indicating a time at which the SFN was incremented. The value indicating the time at which the SFN was incremented may be received in a CUBS, in some examples. In certain examples, the value indicating the time at which the SFN was incremented may be received in a control channel transmission present in a same symbol as a CUBS. In some examples, the SIB transmissions are non-uniformly spaced in time.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
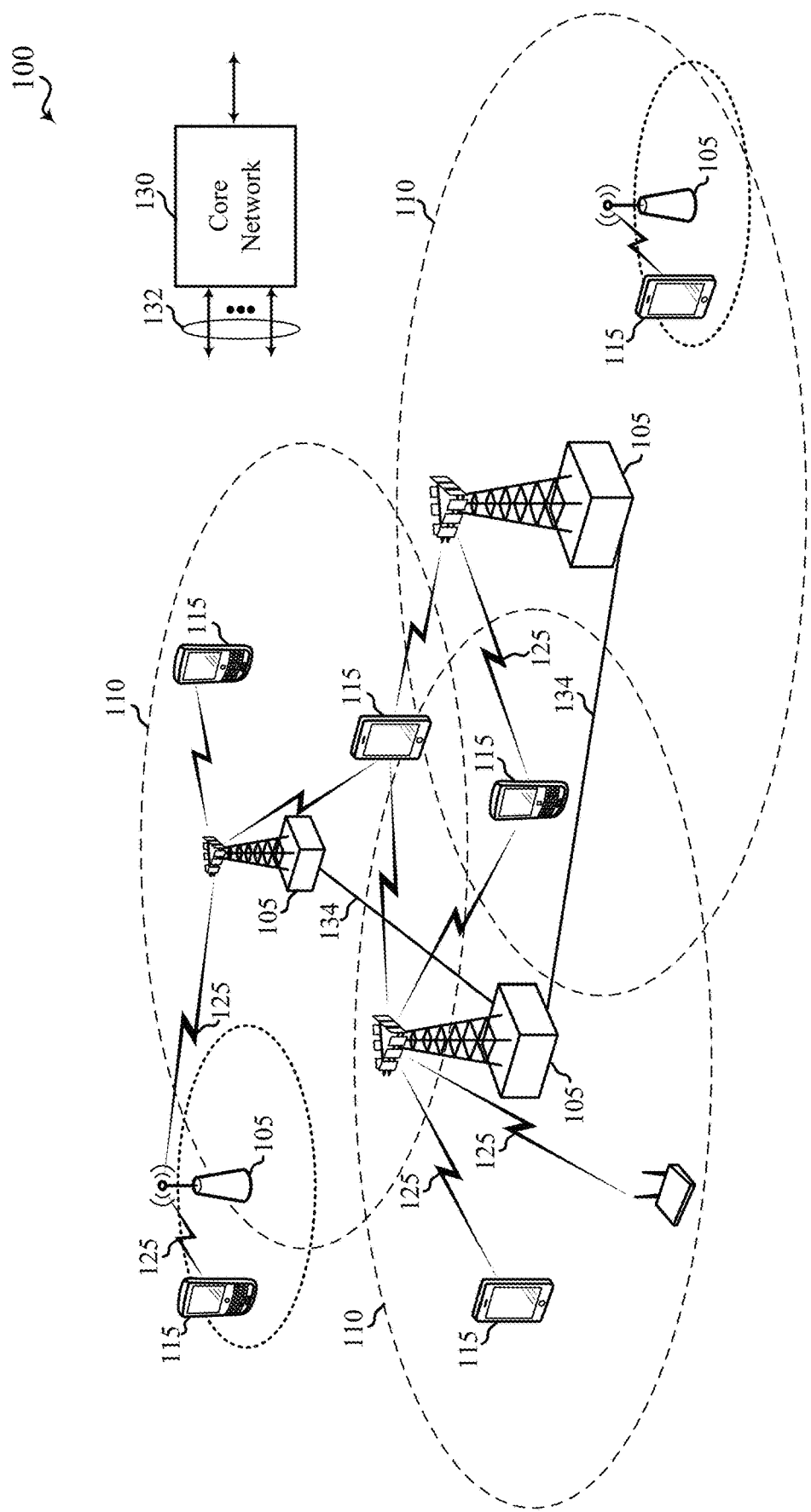
FIG. 1 shows a block diagram of a wireless communication system, in accordance with various aspects of the present disclosure.

Techniques are described for cell discovery for use in gaining contention-based channel access for uplink and downlink transmissions over an unlicensed radio frequency spectrum band. In some examples, the unlicensed radio frequency spectrum band may be used for cellular communications (e.g., Long Term Evolution (LTE) communications or LTE-Advanced (LTE-A) communications). In some examples, the unlicensed radio frequency spectrum band may be a radio frequency spectrum band for which apparatuses may contend for access because the radio frequency spectrum band is available, at least in part, for unlicensed use, such as Wi-Fi use.

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to gain access to the unlicensed radio frequency spectrum band. Such an LBT procedure may include performing a CCA (including, in some examples, an extended CCA) to determine whether a channel of the unlicensed radio frequency spectrum band is available. When it is determined that a channel is not available, a CCA may be performed for the channel again at a later time.

Various disclosed techniques may determine system information to be transmitted using one or more synchronization signals, reference signals, control channels, or shared channels transmitted over an unlicensed radio frequency spectrum band. Such system information may include, for example, information for identifying one or more of symbol timing, slot timing, subframe timing, radio frame timing, system frame number (SFN) timing, a physical cell ID (PCI) of the transmitting cell, a cell global ID (CGI) of the transmitting cell, cell access parameters of the transmitting cell, or LBT parameters. In some examples, one or more signals may communicate a location of system information within a radio frame or an indication that multiple different transmissions may be combined prior to decoding information from the transmissions. The information, in some examples, may be obtained without assistance from an associated cell transmitting an anchor carrier over a licensed radio frequency spectrum band.

In some examples, a system information block (SIB) may be generated and transmitted via a control channel over an unlicensed radio frequency spectrum band. One or more reference signals may be transmitted that indicate a portion of the control channel that includes the SIB, that a receiver may use to decode the SIB and obtain information related to the transmitter of the SIB. In some examples, a SIB may be transmitted in multiple different transmissions prior to being changed and transmitted again in multiple different transmissions. In some examples, an indication is transmitted to indicate that multiple SIB transmissions may be combined by a receiver to enhance the likelihood of successful reception and decoding of the SIB.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of wireless devices 115 (e.g., user equipment (UEs)), and a core network 130. Some of the base stations 105 may communicate with the wireless devices 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the wireless devices 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a wireless local area network (WLAN) access point, a WiFi node or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

In examples that use contention-based channel access, the base stations 105 or the wireless devices 115 may employ one or more techniques to generate and transmit parameters for use in establishing a connection using the unlicensed radio frequency spectrum band. In some examples, a SIB may be generated and transmitted via a control channel over the unlicensed radio frequency spectrum band. One or more reference signals may be transmitted that indicate a portion of the control channel that includes the SIB such that a receiver may use to decode the SIB and obtain information related to a base station 105 that transmits the SIB. In some examples, a SIB may be transmitted in multiple different transmissions prior to being changed and transmitted again in multiple different transmissions. In some examples, an indication is transmitted to indicate that multiple SIB transmissions may be combined by a wireless device 115 to enhance the likelihood of successful reception and decoding of the SIB. In some examples, timing and other parameters related to the transmission of such cell-related information may be provide by an associated base station 105 transmitting an anchor carrier over a licensed radio frequency band.

In other examples, the discovery of cell-related information may be unassisted by transmissions over the licensed radio frequency spectrum band. Various examples of such techniques will be described in more detail below.

The wireless communication system 100 may be or include a Heterogeneous LTE/LTE-A network in which different types of base stations 105 provide coverage for various geographical regions. For example, each base station 105 may provide communication coverage for a macro cell, a small cell such as a pico cell or a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another (e.g., directly or indirectly) via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The wireless devices 115 may be dispersed throughout the wireless communication system 100. A wireless device 115 may also be referred to by those skilled in the art as a UE, a mobile device, a mobile station, a subscriber station, a mobile unit, a subscriber unit, a wireless unit, a remote unit, a wireless communication device, a remote device, a mobile subscriber station, an access terminal, a mobile terminal, a wireless terminal, a remote terminal, a handset, a user agent, a mobile client, a client, or some other suitable terminology. A wireless device 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A wireless device 115 may be able to communicate with macro eNBs, pico eNBs, femto eNBs, relays, and the like. A wireless device 115 may also be able to communicate over different types of access networks, such as cellular or other WWAN access networks, or WLAN access networks. In some modes of communication with a wireless device 115, communication may be conducted over a plurality of communication links 125 or channels (i.e., component carriers), with each channel using a component carrier between the wireless device 115 and one of a number of cells (e.g., serving cells, which cells may in some cases be operated by the same or different base stations 105).

Each component carrier may be provided over the licensed radio frequency spectrum band or the unlicensed radio frequency spectrum band, and a set of component carriers used in a particular mode of communication may all be received (e.g., at a wireless device 115) over the licensed radio frequency spectrum band, over the unlicensed radio frequency spectrum band, or over a combination of the licensed radio frequency spectrum band and the unlicensed radio frequency spectrum band.

The communication links 125 shown in wireless communication system 100 may include uplink channels (using component carriers) for carrying uplink (UL) communications (e.g., transmissions from a wireless device 115 to a base station 105) or downlink channels (using component carriers) for carrying downlink (DL) communications (e.g., transmissions from a base station 105 to a wireless device 115). The UL communications or transmissions may also be called reverse link communications or transmissions, while the DL communications or transmissions may also be called forward link communications or transmissions. The downlink communications or uplink communications may be made using the licensed radio frequency spectrum band, the unlicensed radio frequency spectrum band, or both.

In some examples of the wireless communication system 100, LTE/LTE-A may be deployed under different scenarios using the unlicensed radio frequency spectrum band. The deployment scenarios may include a supplemental downlink mode in which LTE/LTE-A downlink communications in the licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, or a standalone mode in which LTE/LTE-A downlink and uplink communications between a base station 105 and a wireless device 115 may take place in the unlicensed radio frequency spectrum band. Base stations 105 as well as wireless devices 115 may in some examples support one or more of these or similar modes of operation. OFDMA waveforms may be used in the communication links 125 for LTE/LTE-A downlink communications in the licensed radio frequency spectrum band or the unlicensed radio frequency spectrum band, while OFDMA, SC-FDMA or resource block interleaved FDMA waveforms may be used in the communication links 125 for LTE/LTE-A uplink communications in the licensed radio frequency spectrum band or the unlicensed radio frequency spectrum band.

Figure 2:
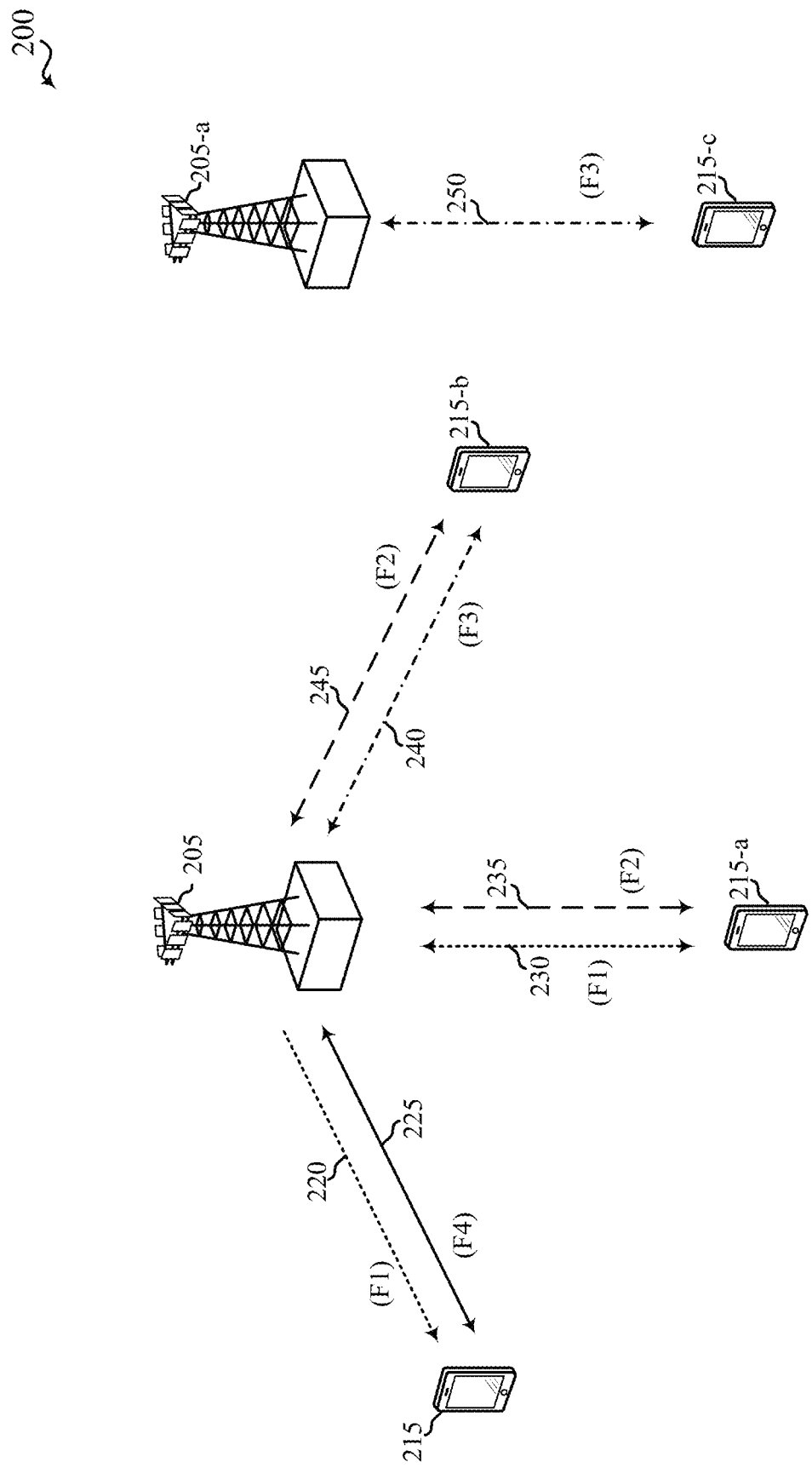
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first wireless device 215, a second wireless device 215-a, a third wireless device 215-b, and a fourth wireless device 215-*c* may be examples of aspects of one or more of the wireless devices 115 described with reference to FIG. 1.

In the example of a supplemental downlink mode in the wireless communication system 200, the first base station 205 may transmit OFDMA waveforms to the first wireless device 215 using a downlink channel 220. The downlink channel 220 may be associated with a frequency F1 in an unlicensed radio frequency spectrum band. The first base station 205 may transmit OFDMA waveforms to the first wireless device 215 using a first bidirectional link 225 and may receive SC-FDMA waveforms from the first wireless device 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one wireless device) or for multicast services (e.g., addressed to several wireless devices). This scenario may occur with any service provider (e.g., a mobile network operator (MNO)) that uses a licensed radio frequency spectrum and wishes to relieve some of the traffic or signaling congestion. In certain examples, the timing for transmission of various reference signals and system information may be synchronized between the first bidirectional link 225 and the downlink channel 220, allowing for first wireless device 215 to rely on timing for the first bidirectional link 225 for timing associated with the downlink channel.

In one example of a carrier aggregation mode in the wireless communication system 200, the first base station 205 may transmit OFDMA waveforms to the second wireless device 215-*a* using a second bidirectional link 230 and may receive OFDMA waveforms, SC-FDMA waveforms, or resource block interleaved FDMA waveforms from the second wireless device 215-*a* using the second bidirectional link 230. The second bidirectional link 230 may be associated with the frequency F1 in the unlicensed radio frequency spectrum band. The first base station 205 may also transmit OFDMA waveforms to the second wireless device 215-*a* using a third bidirectional link 235 and may receive SC-FDMA waveforms from the second wireless device 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and wishes to relieve some of the traffic or signaling congestion.

In certain examples, the timing for transmission of various reference signals and system information may be synchronized between the third bidirectional link 235 and the second bidirectional link 230, allowing for second wireless device 215-*a* to rely on timing for the third bidirectional link 235 to obtain timing associated with the second bidirectional link 230. In other examples, the third bidirectional link 235 may not be synchronized with the second bidirectional link 230, and thus the second wireless device 215-*a* may obtain system information and timing for transmissions of system information without the assistance of transmissions from the base station 205 using the licensed radio frequency spectrum band. Such system information may include, for example, information for identifying one or more of symbol timing, slot timing, subframe timing, radio frame timing, system frame number (SFN) timing, a physical cell ID (PCI) of the transmitting cell, a cell global ID (CGI) of the transmitting cell, cell access parameters of the transmitting cell, or LBT parameters.

In another example of a carrier aggregation mode in the wireless communication system 200, the first base station 205 may transmit OFDMA waveforms to the third wireless device 215-*b* using a fourth bidirectional link 240 and may receive OFDMA waveforms, SC-FDMA waveforms, or resource block interleaved waveforms from the third wireless device 215-*b* using the fourth bidirectional link 240. The fourth bidirectional link 240 may be associated with a frequency F3 in the unlicensed radio frequency spectrum band. The first base station 205 may also transmit OFDMA waveforms to the third wireless device 215-*b* using a fifth bidirectional link 245 and may receive SC-FDMA waveforms from the third wireless device 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205.

Similarly as described with respect to second wireless device 215-*a*, in certain examples, the timing for transmission of various reference signals and system information may be synchronized between the fifth bidirectional link 245 and the fourth bidirectional link 240, allowing for third wireless device 215-*b* to rely on timing for the fifth bidirectional link 245 to obtain timing associated with the fourth bidirectional link 240. In other examples, the fifth bidirectional link 245 may not be synchronized with the fourth bidirectional link 240, and thus the third wireless device 215-*b* may obtain system information and timing for transmissions of system information without the assistance of transmissions from the base station 205 using the licensed radio frequency spectrum band. Such system information may include, for example, information for identifying one or more of symbol timing, slot timing, subframe timing, radio frame timing, system frame number (SFN) timing, a physical cell ID (PCI) of the transmitting cell, a cell global ID (CGI) of the transmitting cell, cell access parameters of the transmitting cell, or LBT parameters. This example and those provided above are presented for illustrative purposes and there may be other similar modes of operation or deployment scenarios that combine LTE/LTE-A in licensed radio frequency spectrum and unlicensed access radio frequency spectrum for capacity offload.

As described above, one type of service provider that may benefit from the capacity offload offered by using LTE/LTE-A in unlicensed access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth wireless device 215-*c* using a bidirectional link 250 and may receive OFDMA waveforms, SC-FDMA waveforms, or resource block interleaved FDMA waveforms from the fourth wireless device 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

The timing for transmission of various reference signals and system information in a standalone mode may be not synchronized with any signals transmitted over a licensed radio frequency spectrum band. Thus the fourth wireless device 215-*c* may obtain system information and timing for transmissions of system information without the assistance of transmissions from the base station 205-*a*, or other base stations, using the licensed radio frequency spectrum band. Such system information may include, for example, information for identifying one or more of symbol timing, slot timing, subframe timing, radio frame timing, system frame number (SFN) timing, a physical cell ID (PCI) of the transmitting cell, a cell global ID (CGI) of the transmitting cell, cell access parameters of the transmitting cell, or LBT parameters. In some examples, a system information may be generated and transmitted via a control channel over the bidirectional link 250 on the unlicensed radio frequency spectrum band. One or more reference signals may be transmitted that indicate a portion of the control channel that includes the system information, and fourth wireless device 215-*c* may use this information to decode the system information. In some examples, the information may be transmitted in multiple different transmissions prior to being changed and transmitted again in multiple different transmissions. In some examples, an indication may be transmitted to indicate that multiple of the system information transmissions may be combined by the fourth wireless device 215-*c* to enhance the likelihood of successful reception and decoding of the system information.

In some examples, a transmitting apparatus such as one of the base stations 105, 205, or 205-*a* described with reference to FIG. 1 or 2, or one of the wireless devices 115, 215, 215-*a*, 215-*b*, or 215-*c* described with reference to FIG. 1 or 2, may use a gating interval to gain access to a channel of an unlicensed radio frequency spectrum band (e.g., to a physical channel of the unlicensed radio frequency spectrum band). The gating interval may define the application of a contention-based protocol in an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus is to perform a contention procedure, such as a clear channel assessment (CCA). The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve or use the channel of the unlicensed radio frequency spectrum band during part or all of the LBT radio frame. A transmitting apparatus operating according to such techniques may be referred to, in some examples, as a frame based equipment (FBE). When the CCA indicates that the channel is not available (e.g., that the channel is in use or reserved by another apparatus), the transmitting apparatus may be prevented from using the channel during the LBT radio frame.

Figure 3:
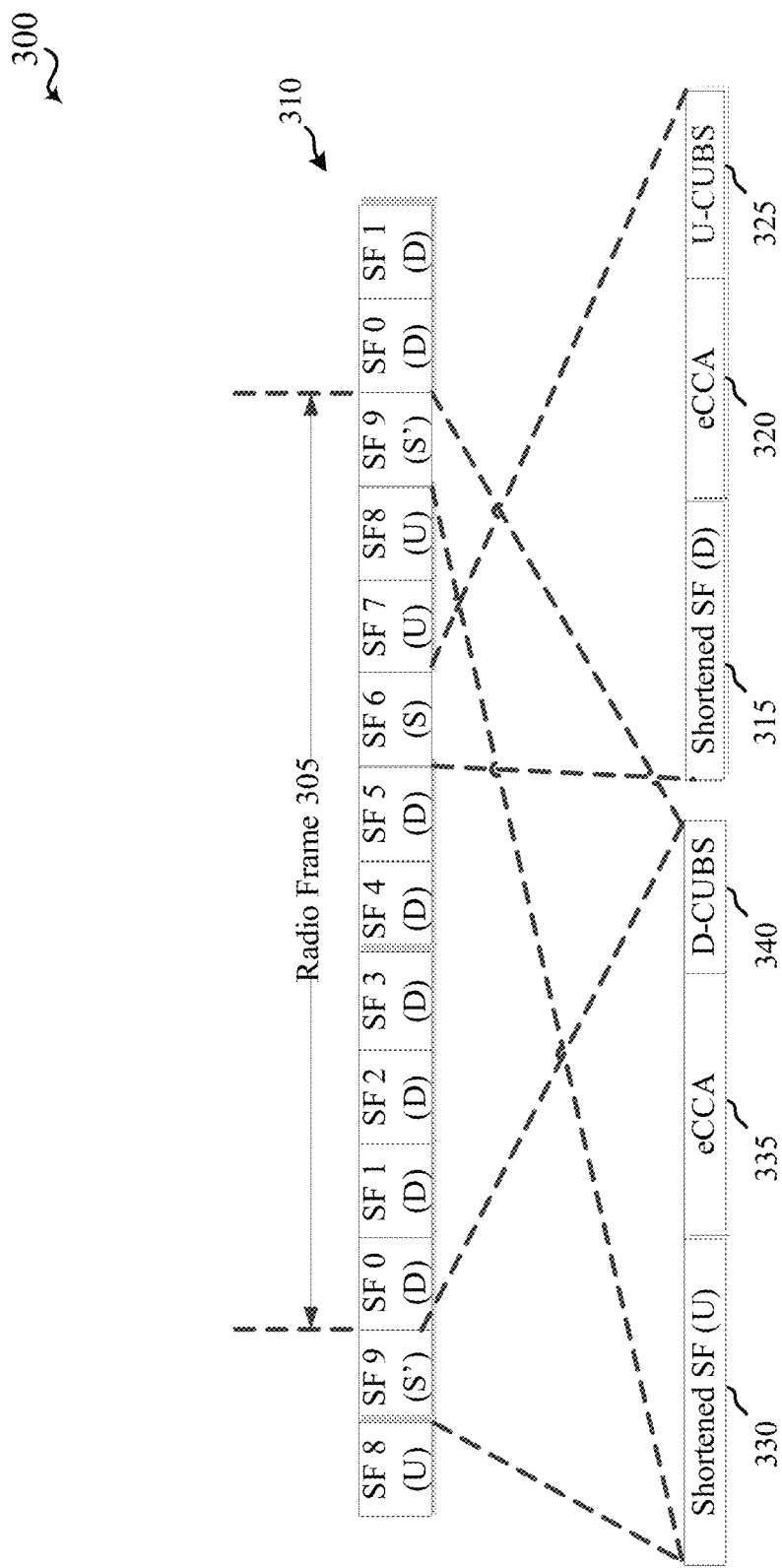
FIG. 3 shows an example of a wireless communication transmissions over an unlicensed radio frequency spectrum band, in accordance with various aspects of the present disclosure.

FIG. 3 shows a diagram 300 of a radio frame 305 defining a plurality of subframes 310 for a particular TDD configuration. In FIG. 3, the radio frame 305 includes 10 subframes 310, with subframes 0, 1, 2, 3, 4, and 5 being downlink (D) subframes, subframe 6 being a special (S) subframe (which includes a shortened downlink subframe 315, an extended CCA (eCCA) subframe 320, and an uplink channel usage beacon signal (U-CUBS) subframe 325), subframes 7 and 8 being uplink (U) subframes, and subframe 9 being another special (S') subframe (which includes a shortened uplink subframe 330, an eCCA subframe 335, and a (downlink channel usage beacon signal) D-CUBS subframe 340).

Figure 4:
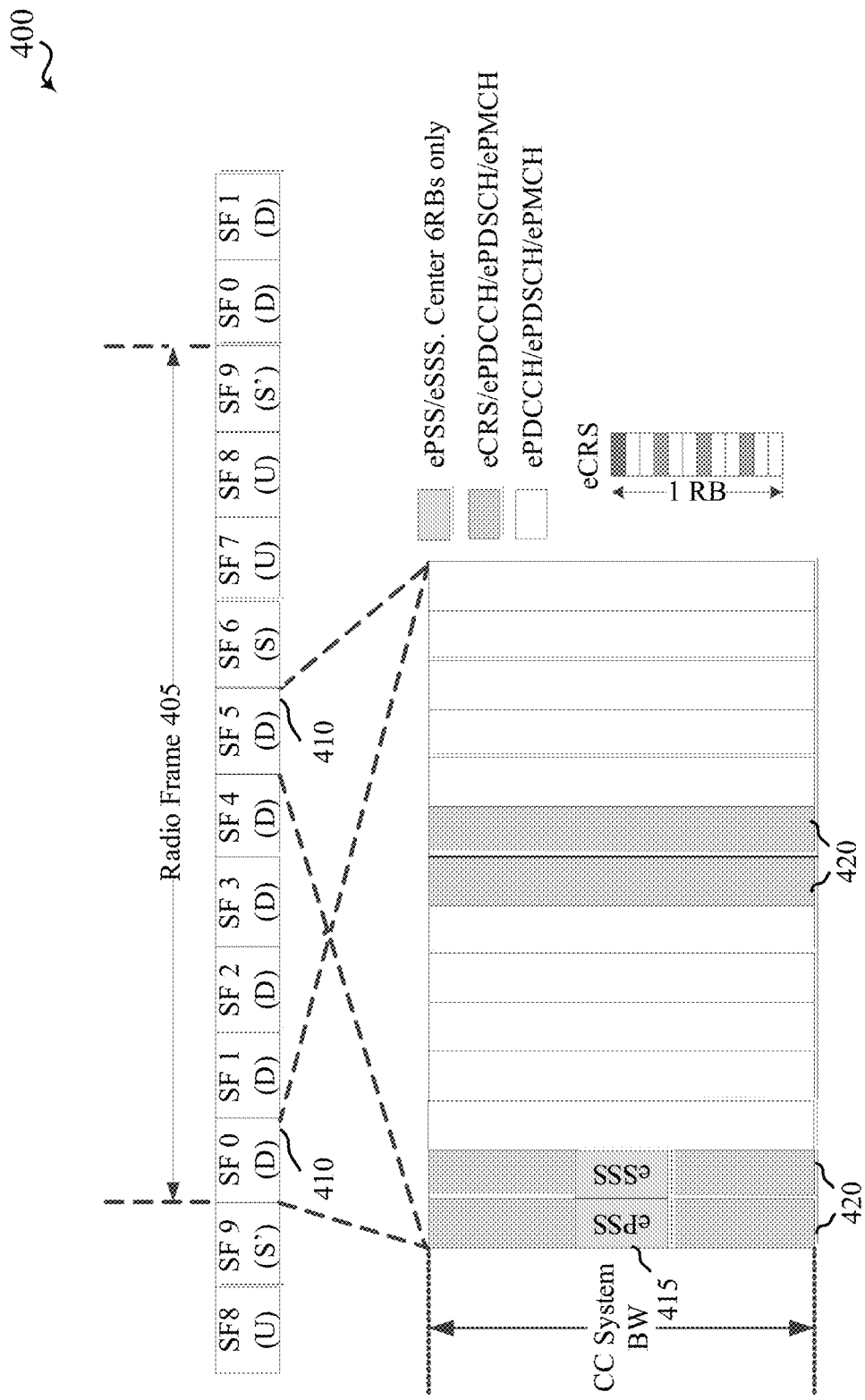
FIG. 4 shows an example timing diagram illustrating the transmission of various control signals and data channels during a radio frame over an unlicensed radio frequency spectrum band, in accordance with various aspects of the present disclosure.

FIG. 4 shows a diagram 400 with more detail regarding certain subframes 410 of radio frame 405. Radio frame 405 may be an example of radio frame 305 described above with reference to FIG. 3. More specifically, FIG. 4 shows the location in frequency and time of one or more synchronization signals 415 (e.g., evolved primary synchronization signal (ePSS), evolved primary synchronization signal (eSSS), or a combination thereof), and an evolved common reference (eCRS) signal 420. In some examples, the ePSS/eSSS 415, and eCRS 420 signals may be transmitted in subframe 0 in a downlink CCA exempt transmission (D-CET) frame every 80 milliseconds, as will be described in more detail below. In addition, these signals may be opportunistically provided during non-CET subframes based on eCCA success (i.e., they may be provided in non-CET subframes in which the transmitter is successful at obtaining the channel).

As illustrated in FIG. 4, in some examples, the ePSS/eSSS 415, and eCRS 420 may opportunistically be provided in subframes 0 and 5 (mod 10). More particularly, FIG. 4 shows ePSS being provided in the 6 center resource blocks (RBs) in symbol 0 of subframe 0 or 5 (mod 10) and eSSS being provided in the 6 center RBs in symbol 1 of subframe 0 or 5 (mod 10), with the ePSS/eSSS 415 providing a physical cell identification (PCI) together with symbol, slot, or radio frame boundary information, in some examples. FIG. 4 also shows an eCRS 420 being provided in symbols 0, 1, 7, and 8 of subframe 0 or 5 (mod 10) together with an evolved physical downlink control channel (ePDCCH), an evolved physical downlink shared channel (ePDSCH), and an evolved physical multicast channel (ePMCH), with these components spanning the entire component carrier in those symbols, and the eCRS 420 providing PCI information in some examples. In certain examples, the eCRS 420 may implicitly indicate a system frame number (SFN) timing such that a wireless device, such as wireless device 115 or 215 of FIG. 1 or 2, can determine a SFN timing based on a periodicity of the sequence of the eCRS 420. The sequence of the eCRS 420 may have a periodicity of 80 milliseconds in some examples (e.g., in standalone mode), and may be punctured in subframes 1-4, 6-9 in a radio frame. In the other symbols (2-6 and 9-13) of the subframes, ePDCCH, ePDSCH, and ePMCH information may be provided over the component carrier.

Figure 5:
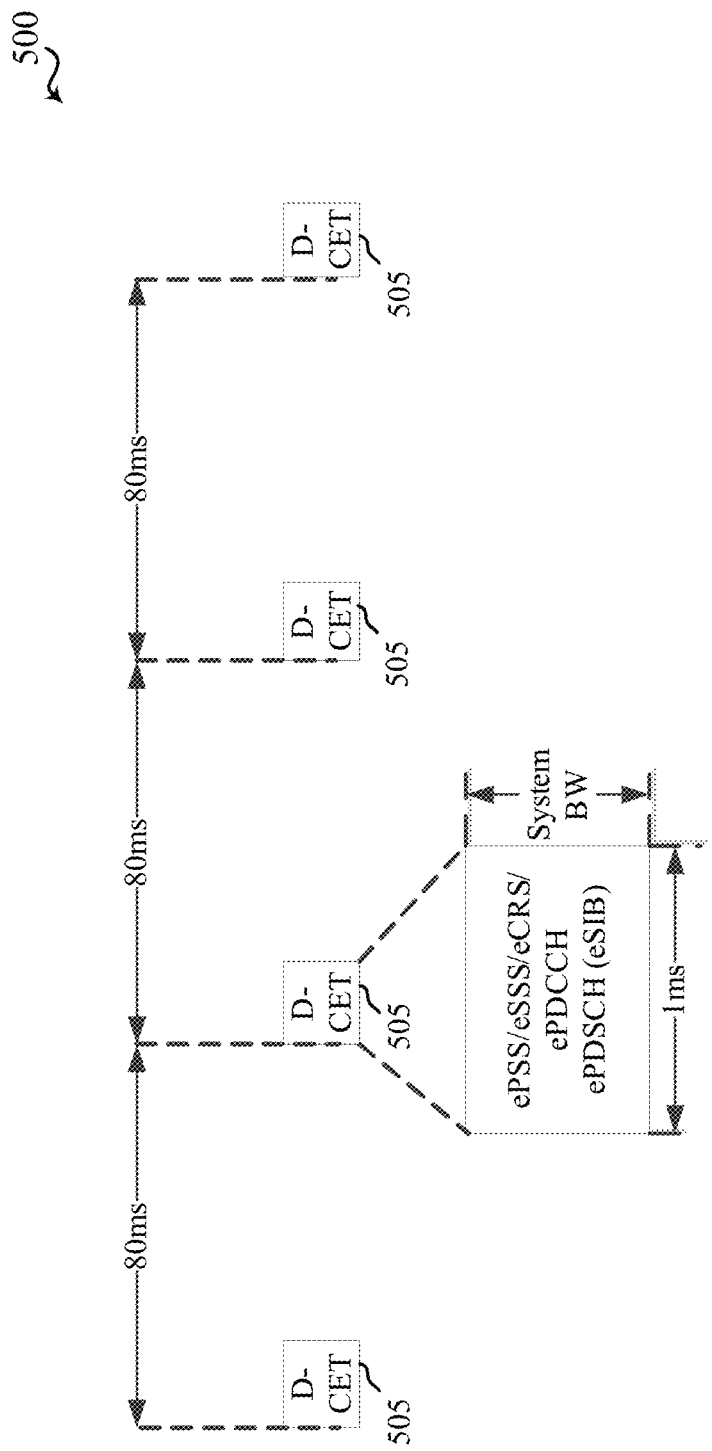
FIG. 5 shows an example timing diagram illustrating the transmission of various parameters during a clear channel assessment (CCA) exempt transmission (CET) subframe over an unlicensed radio frequency spectrum band, in accordance with various aspects of the present disclosure.

FIG. 5 shows a timing diagram 500 illustrating the transmission of a plurality of parameters during a CCA exempt transmission (CET) subframe 505 over an unlicensed radio frequency spectrum band. The parameters may relate to a base station, a UE, transmissions between the base station and UE, and so forth, and may include one or more of an evolved system information block (eSIB) (which may also be referred to simply as a system information block or SIB), evolved primary and secondary synchronization signals (ePSS, eSSS) (which may be generated at a base station such as base stations 105 or 205 as discussed above with respect to FIG. 1 or 2), evolved common or cell-specific reference signal (eCRS), and so forth. In some examples, the eSIB may provide system information for cell discovery, and may include a listen-before-talk (LBT) parameter (such as an extended CCA (eCCA) counter parameter, a CCA energy threshold, a guard period for base station resynchronization, or some combination thereof), a cell identifier (such as a physical cell identifier (PID), an operator (e.g., a PLMN operator) identifier, a cell global identifier (CGI), or some combination thereof), a radio frame identifier (such as a system frame number (SFN)) and timing, and so forth. Thus, in some examples, a single CET subframe 505 may be used to send both access parameters (for a standalone implementation) and LBT/CCA parameters (for a carrier aggregation implementation).

The LBT/CCA parameters may also include a CCA energy threshold, which defines a threshold at which a CCA will be deemed to be successful, and which may also be advertised in the eSIB. The LBT/CCA parameters may also include a guard period, which defines a period for base station resynchronization, and which may also be advertised in the eSIB.

As illustrated in FIG. 5, the CET subframe 505 may be associated with the unlicensed radio frequency spectrum band, and may be transmitted by a base station and received by any wireless devices within range of the base station at a certain interval, such as every 80 milliseconds. The CET subframe 505 may be relatively short—for example 1 millisecond as illustrated in FIG. 5. In one example, as shown in FIG. 5, the CET transmission subframe 505, including for example the eSIB, may be transmitted at the beginning (e.g., in subframe 0) of the 80 millisecond interval. The transmission of the CET subframe 505 is thus periodic, and, in some examples, one or more of the parameters, such as the eSIB, may be transmitted by the base station at every instance of the CET subframe 505.

As mentioned above, in some examples, some of the parameters that are transmitted during the CET subframe 505 may also be transmitted opportunistically at certain times in between CET subframes 505. For example, the eSIB may be transmitted in non-CET subframes in some examples after the base station performs a CCA prior to the non-CET subframe if the CCA is successful. Such non-CET transmissions of the eSIB may be at predefined intervals, such as at 20, 40, and 60 millisecond markers of the 80 millisecond interval illustrated in FIG. 5. Non-CET transmissions of the eSIB may be used to communicate dynamically modified LBT parameters or to provide different redundancy versions of the eSIB at different time intervals, as will be discussed in more detail below.

Still referring to FIG. 5, in one example, the transmission of one or more of the parameters (such as the eSIB) during the CET subframe 505 may span an entire bandwidth of a component carrier associated with the unlicensed radio frequency spectrum band. For example, the eSIB may be transmitted using an entire 20 MHz component carrier for 2.4 Ghz or 5 GHz bands, an entire 10 MHz component carrier for a 3.5 GHz band, an entire 5 MHz component carrier for a 900 MHz band, and so forth.

Figure 6:
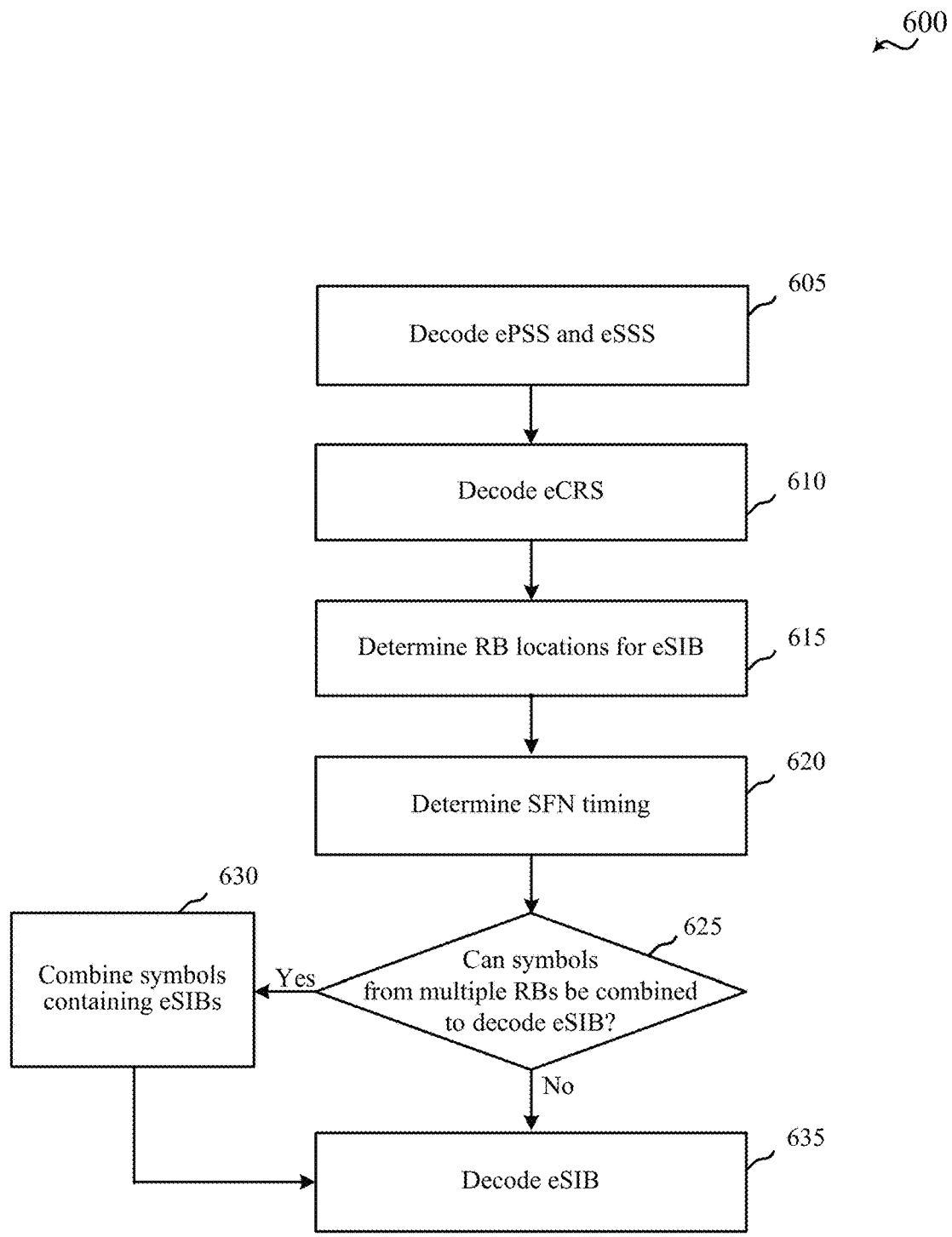
FIG. 6 is a flow chart illustrating an example of a method for wireless communication, in accordance with various aspects of the present disclosure.

FIG. 6 is a flow chart illustrating an example of a method 600 for wireless communication, in accordance with various aspects of the present disclosure. For clarity, the method 600 is described below with reference to aspects of one or more of the base stations 105 or 205, or wireless devices 115 or 215 described with reference to FIG. 1 or 2. In some examples a base station or wireless device may execute one or more sets of codes to control the functional elements of the base station or wireless device to perform the functions described below.

At block 605, the method 600 may include decoding ePSS and eSSS. As mentioned above, in some examples a base station may transmit ePSS and eSSS in the center 6 resource blocks of symbols 0 and 1 in subframe 0 (and in some examples subframe 5) of a radio frame. These narrowband ePSS/eSSS transmissions may be used to determine, for example, symbol timing, slot timing, subframe timing, radio frame boundaries, and PCI. The information from the ePSS/eSSS may be used to assist in decoding the broadband eCRS, as indicated at block 610. In some examples, the eCRS may be used for, for example, PCI confirmation, determining an ePDCCH common search space for obtaining an eSIB, or determining SFN timing.

At block 615, the RB locations of the eSIB are determined. The ePDCCH common search space may include one or more RBs that contain the eSIB. Such RBs may be determined according to specified network operation, and may be determined, for example, as a function of the PCI, according to an explicit specification of which RBs contain the eSIB, or as a function of some other specified parameter. In other examples, the RBs that include the eSIB may be signaled via the eCRS, such as, for example, through two or more bits that are mapped to RBs that contain the eSIB. Thus the eSIB may be transmitted on a channel that includes a plurality of resource blocks, and the reference signal indicates a subset of the plurality of resource blocks that include the SIB. In some examples, the eCRS may include a physical cell identity (PCI), with the plurality of resource blocks are mapped to the PCI. In other examples, the subset of the plurality of resource blocks may be predetermined based on a timing of the eCRS, or the eCRS may include information indicating a location of the subset of resource blocks.

As mentioned above, when a wireless device seeks to access a network through wireless communications with a base station, one of the items of information may be the SFN, which may be used for decoding received symbols. In some examples, the SFN is incremented once every certain number of radio frames, such as once every eight radio frames. Thus, in such examples, the SFN is incremented once every 80 ms. The eSIB, in such examples, may change when the SFN is incremented, but otherwise contain the same information, which may allow multiple transmissions of the eSIB to be combined to provide more reliable reception of the eSIB, in a procedure known as soft combining. In order to perform soft combining, a wireless device may know which transmissions contain the same eSIB information (i.e., when the SFN is not incremented in one symbol relative to another) and can therefore be combined.

With continued reference to FIG. 6, The SFN timing, according to certain examples, may be determined, according to block 620. The SFN timing may be determined according to various techniques. In one example, the eCRS periodicity may be 10 ms, and the eSIB opportunistically transmitted multiple times with the periodicity of a CET (referred to as N_cet). For example, N_cet of FIG. 5 is 80 ms, although this periodicity may be longer or shorter. In such an example, the eSIB may be transmitted at uniform spacing within N_cet. For example, if a CET occurs at subframe 0, opportunistic transmissions of the eSIB may occur at subframes 20, 40, and 60 (mod 80) for N_cet of 80 ms. Similarly, if a CET occurs at subframe 0, opportunistic transmissions of the eSIB may occur at subframes 10, 20, and 30 (mod 40) for N_cet of 40 ms. In such examples, the ePDCCH may include a redundancy version (RV) that may indicate a redundancy of the eSIB. Different RVs may then be transmitted in guaranteed and opportunistic subframes. A wireless device may then infer SFN timing from the RV. For example, there may be one-to-one mapping between the RV and subframe number (mod N_cet). Thus, RV={0, 1, 2, 3} in subframes {0, 20, 40, 60} mod 80. The wireless device would then be able to determine which of the subframes include an eSIB that may be combined.

In another example, the eCRS periodicity may be set to N_cet ms. In such a manner, the SFN timing may be inferred based on a reception of the eCRS, and the eSIB may be opportunistically transmitted within N_cet at non-uniform time intervals. Thus, in a situation where a base station may not gain channel access reliably due to other transmitters contending for channel access of an unlicensed radio frequency spectrum band, the eSIB may be transmitted in any radio frame where CCA succeeds. A wireless device may know based on the eCRS reception that subsequent transmissions of the eSIB until the next eCRS will have the same RV. For example, if N_cet=80, the eSIB may be received in the CET transmission at subframe 0, and also may be received in one or more opportunistic transmission, such as in subframes 12, 42, 54 (mod 80), to name but one example.

In further examples, the ePDCCH may be used to signal an RV index or explicitly signal a radio frame number, which may be used to determine whether eSIBs may be combined. In such examples, the eCRS periodicity may be 10 ms and the eSIB may be opportunistically transmitted within N_cet at non-uniform time intervals, and therefore may be transmitted in any radio frame where CCA succeeds. The RV signaled in the ePDCCH may be used by a wireless device to infer SFN timing based on an RV index or based on an explicit signaling of the radio frame number in the RV. For example, the RV index may have a mapping between the RV and a radio frame number (mod N_cet), which the wireless device may use to infer which transmissions of the eSIB may be combined.

In still further examples, a wireless device may infer SFN timing from a D-CUBS signal or an evolved physical control format indicator channel (ePCFICH). In such examples, the eCRS periodicity may be 10 ms, and the eSIB opportunistically transmitted within N_cet at non-uniform time intervals, thus allowing the eSIB to be transmitted in any radio frame where CCA succeeds. The base station may convey RV information in a D-CUBS transmission, or in an ePCFICH transmission that is transmitted in the same symbol as D-CUBS. In such examples, the wireless device may infer SFN timing after ePSS/eSSS acquisition from the D-CUBS or ePCFICH transmission. The D-CUBS or ePCFICH transmission may include a number of bits that indicate SFN timing such as, for example, number of bits=log 2(N_cet/ 10). From this information, the wireless device may infer which eSIB transmission may be combined.

With continued reference to FIG. 6, after the SFN timing is determined, it is determined whether symbols from multiple RBs can be combined to decode the eSIB, as indicated at block 625. If symbols from multiple RBs can be combined, the symbols containing the eSIB are combined, according to block 630. After the symbols are combined, or if symbols from multiple RBs cannot be combined, the eSIB is decoded, as indicated at block 635. As discussed above, the eSIB may contain various items of information for cell discovery, such as SFN, PLMN ID, base station access parameters, or LBT parameters, for example.

Figure 7:
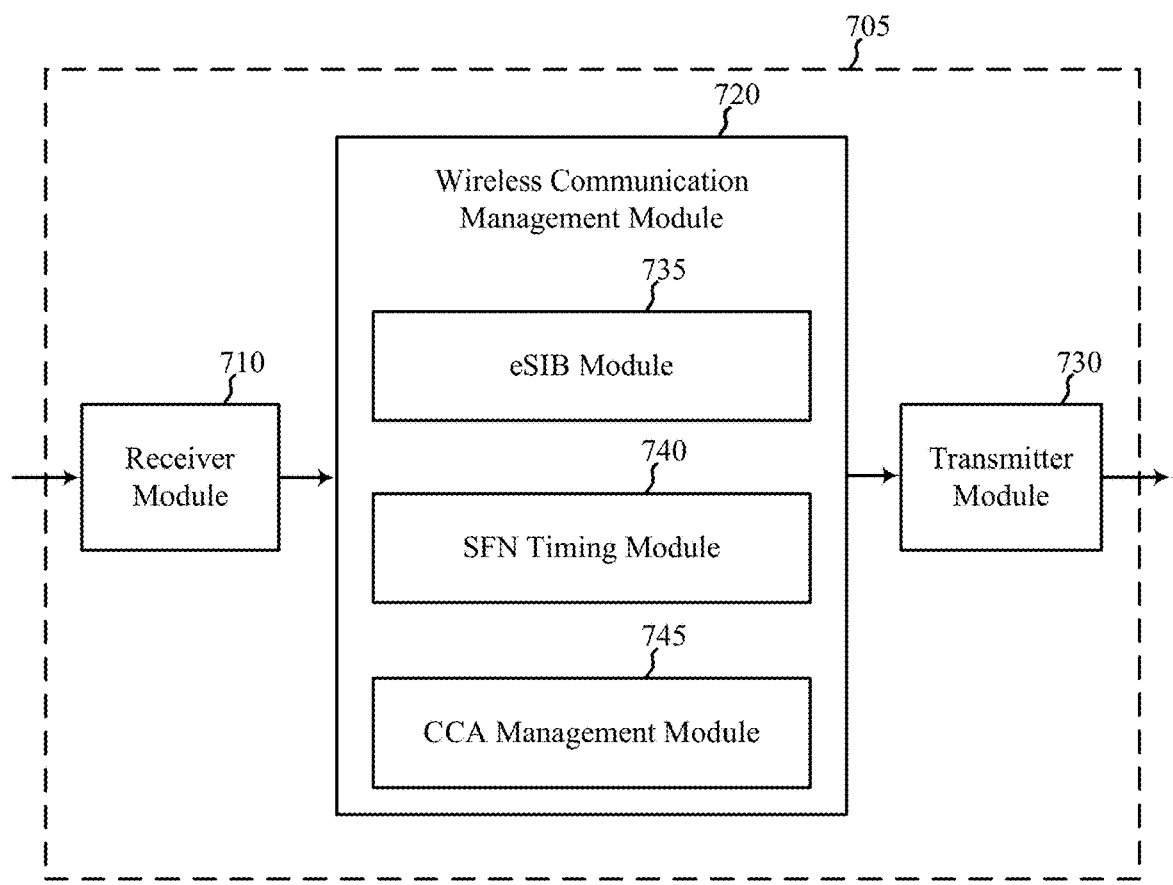
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the base stations 105, 205, or 205-a, or the apparatus may be an example of aspects of one or more of the wireless devices 115, 215, 215-a, 215-b, or 215-c described with reference to FIG. 1 or 2. The apparatus 705 may also be a processor. The apparatus 705 may include a receiver module 710, a wireless communications management module 720, or a transmitter module 730. Each of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 710 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may contend for access because the radio frequency spectrum band is available, at least in part, for unlicensed use such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, or 6. The receiver module 710 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 730 may include at least one RF transmitter, such as at least one RF transmitter operable to transmit over the licensed radio frequency spectrum band or the unlicensed radio frequency spectrum band. The transmitter module 730 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communications management module 720 may be used to manage one or more aspects of wireless communication for the apparatus 705. In some examples, the wireless communications management module 720 may include an eSIB module 735, a SFN timing module 740, or a CCA management module 745. Each of these components may be in communication with each other.

In some examples, the eSIB module 735 may be used to indicate a location for a common search space in which an eSIB is transmitted, and may identify locations in a CET or opportunistic transmission of the eSIB, similarly as discussed above. The SFN timing module 740 may be used to indicate SFN timing information, which may be used to infer that multiple transmissions of an eSIB may be combined, similarly as discussed above. The CCA management module 745 may perform CCA procedures according to any of the various techniques described herein. Various of the monitored channel parameters, timing, and identification information that may be derived therefrom, and CCA techniques are discussed for various examples above, and are not repeated here for the sake of brevity.

Figure 8:
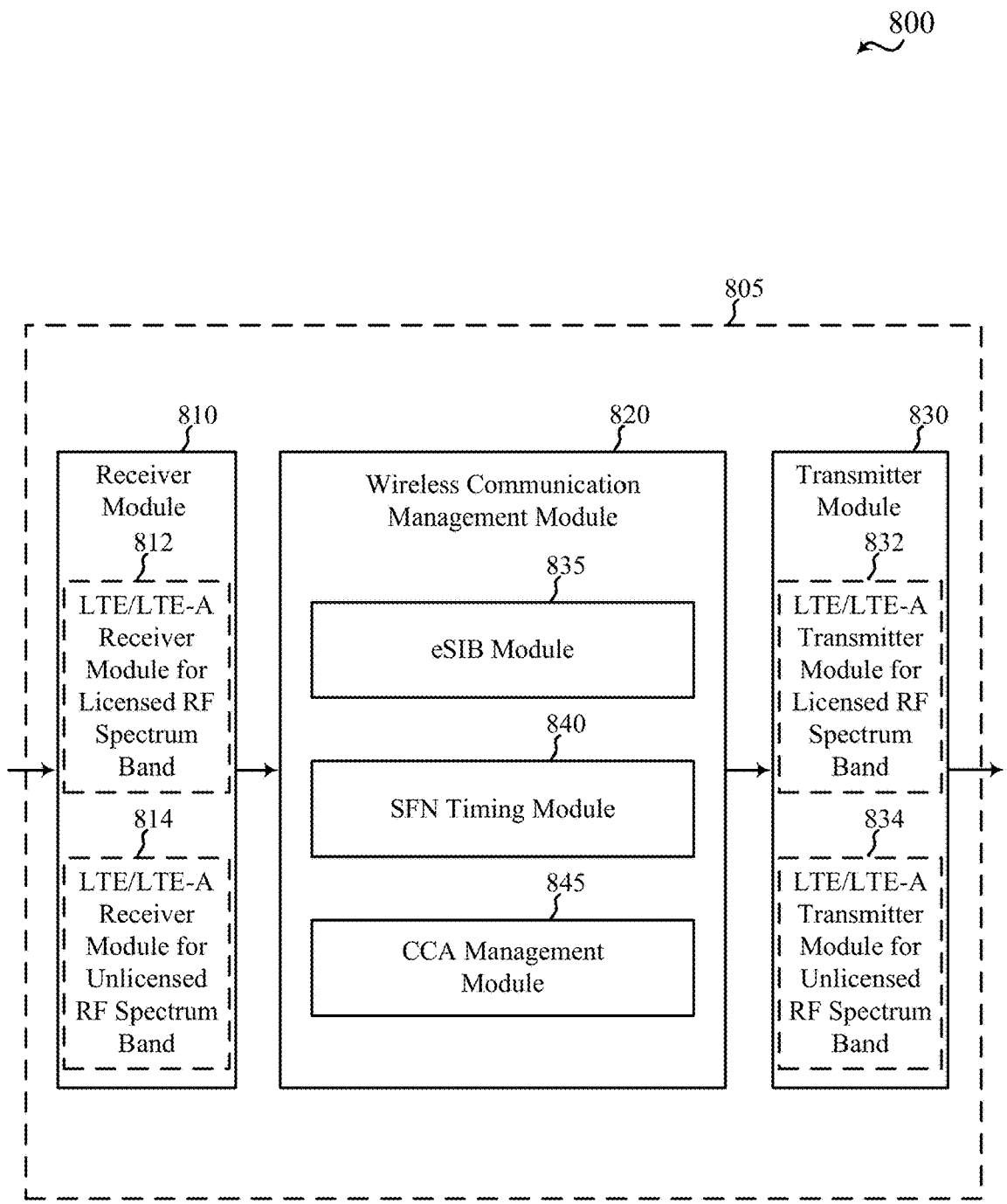
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the base stations 105, 205, or 205-*a*, the apparatus may be an example of aspects of one or more of the wireless devices 115, 215, 215-*a*, 215-*b*, or 215-*c* described with reference to FIG. 1 or 2, or the apparatus may be an example of aspects of the apparatus 705 described with reference to FIG. 7. The apparatus 805 may also be a processor. The apparatus 805 may include a receiver module 810, a wireless communications management module 820, or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 810 may be an example of one or more aspects of the receiver module 710 described with reference to FIG. 7. In some examples, the receiver module 810 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may contend for access because the radio frequency spectrum band is available, at least in part, for unlicensed use such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, 6, or 7. The receiver module 810 may in some cases include separate receivers for the licensed radio frequency spectrum band and the unlicensed radio frequency spectrum band. The separate receivers may, in some examples, take the form of an LTE/LTE-A receiver module for licensed radio frequency spectrum band 812, for communicating over the licensed radio frequency spectrum band, and an LTE/LTE-A receiver module for unlicensed radio frequency spectrum band 814, for communicating over the unlicensed radio frequency spectrum band. The receiver module 810 may also include receiver modules for communicating over other radio frequency spectrum bands or for communicating via other radio access technologies (e.g., Wi-Fi). The receiver module 810, including the LTE/LTE-A receiver module for licensed radio frequency spectrum band 812 and the LTE/LTE-A receiver module for unlicensed radio frequency spectrum band 814, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 830 may include at least one RF transmitter, such as at least one RF transmitter operable to transmit over the licensed radio frequency spectrum band or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of an LTE/LTE-A transmitter module for licensed radio frequency spectrum band 832, for communicating over the licensed radio frequency spectrum band, and an LTE/LTE-A transmitter module for unlicensed radio frequency spectrum band 834, for communicating over the unlicensed radio frequency spectrum band. The transmitter module 830 may also include transmitter modules for communicating over other radio frequency spectrum bands or for communicating via other radio access technologies (e.g., Wi-Fi). The transmitter module 830, including the LTE/LTE-A transmitter module for licensed radio frequency spectrum band 832 and the LTE/LTE-A transmitter module for unlicensed radio frequency spectrum band 834 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communications management module 820 may be used to manage one or more aspects of wireless communication for the apparatus 805. In some examples, the wireless communications management module 820 may be an example of one or more aspects of the wireless communications management module 720 described with reference to FIG. 7. In some examples, the wireless communications management module 820, may include an eSIB module 835, a SFN timing module 840, or a CCA management module 845. Each of these components may be in communication with each other.

In some examples, the eSIB module 835 may be used to indicate a location for a common search space in which an eSIB is transmitted, and may identify locations in a CET or opportunistic transmission of the eSIB, similarly as discussed above. The SFN timing module 840 may be used to indicate SFN timing information, which may be used to infer that multiple transmissions of an eSIB may be combined, similarly as discussed above. The CCA management module 845 may perform CCA procedures according to any of the various techniques described herein. Various of the monitored channel parameters, timing, and identification information that may be derived therefrom, and CCA techniques are discussed for various examples above, and are not repeated here for the sake of brevity.

Figure 9:
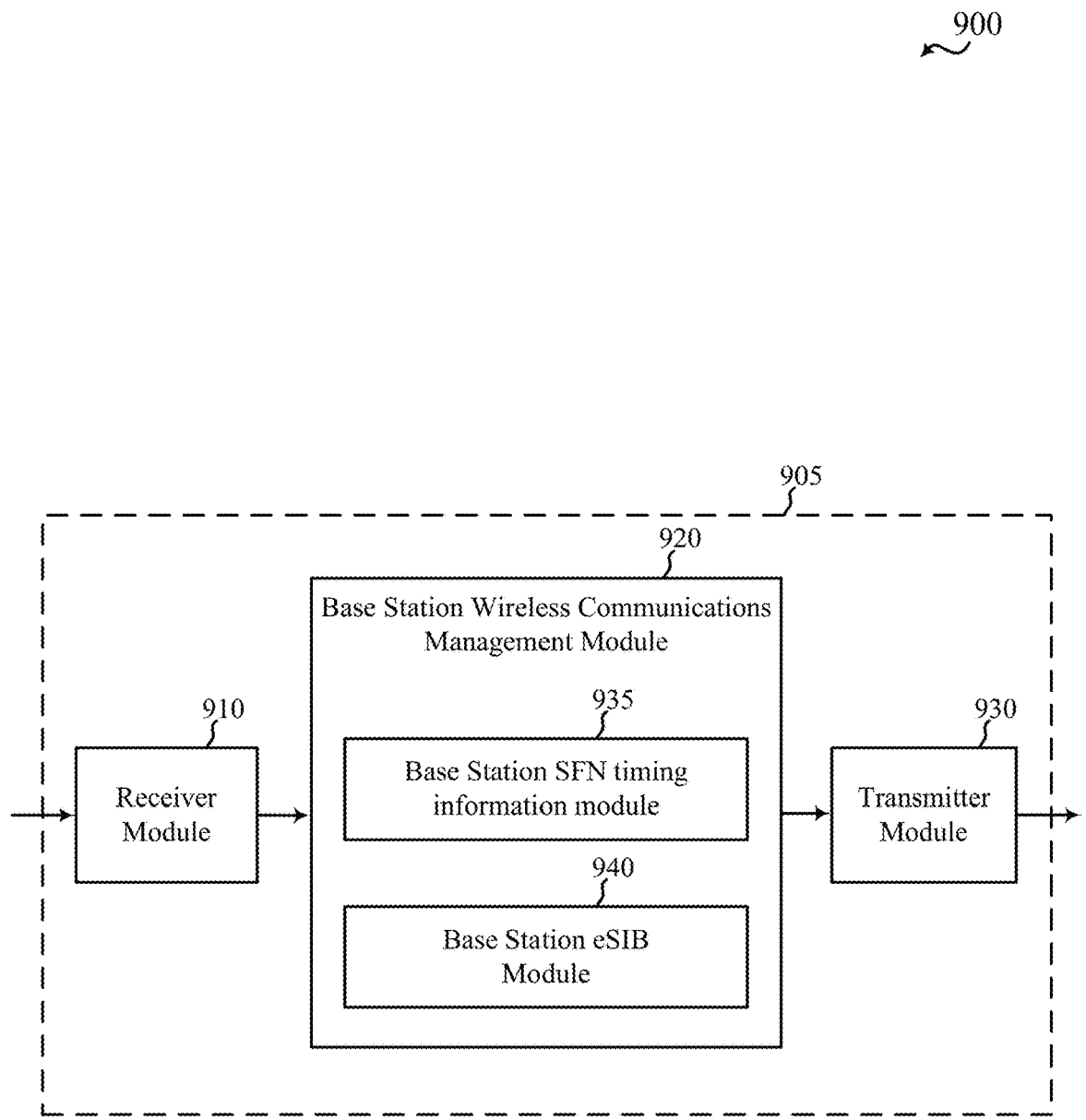
FIG. 9 shows a block diagram of another apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, or 205-*a* described with reference to FIG. 1, or 2. The apparatus 905 may also be a processor. The apparatus 905 may include a receiver module 910, a base station wireless communications management module 920, or a transmitter module 930. Each of these components may be in communication with each other.

The components of the apparatus 905 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors In some examples, the receiver module 910 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or an unlicensed radio frequency spectrum band (e.g., a radio frequency spectrum band for which apparatuses may contend for access because the radio frequency spectrum band is available, at least in part, for unlicensed use such as Wi-Fi use). In some examples, the licensed radio frequency spectrum band or the unlicensed radio frequency spectrum band may be used for LTE/LTE-A communications, as described, for example, with reference to FIG. 1, 2, 3, 4, 5, 6, 7, or 8. The receiver module 910 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 930 may include at least one RF transmitter, such as at least one RF transmitter operable to transmit over the licensed radio frequency spectrum band or the unlicensed radio frequency spectrum band. The transmitter module 930 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the base station wireless communications management module 920 may be used to manage one or more aspects of wireless communication for the apparatus 905. In some examples, the base station wireless communications management module 920 may include a base station SFN timing information module 935, or a base station eSIB module 940. Each of these components may be in communication with each other.

In some examples, the base station SFN timing information module 935 may be used to determine timing information for incrementing an SFN, and transmit an indication of the SFN timing for use in determining whether multiple transmissions of an eSIB may be combined, similarly as discussed above. The base station eSIB module 940 may be used to indicate a location for a common search space in which an eSIB is transmitted, and may identify locations in a CET or opportunistic transmission of the eSIB, similarly as discussed above. Various of the SFN timing and eSIB location and combining techniques are discussed for various examples above, and are not repeated here for the sake of brevity.

Figure 10:
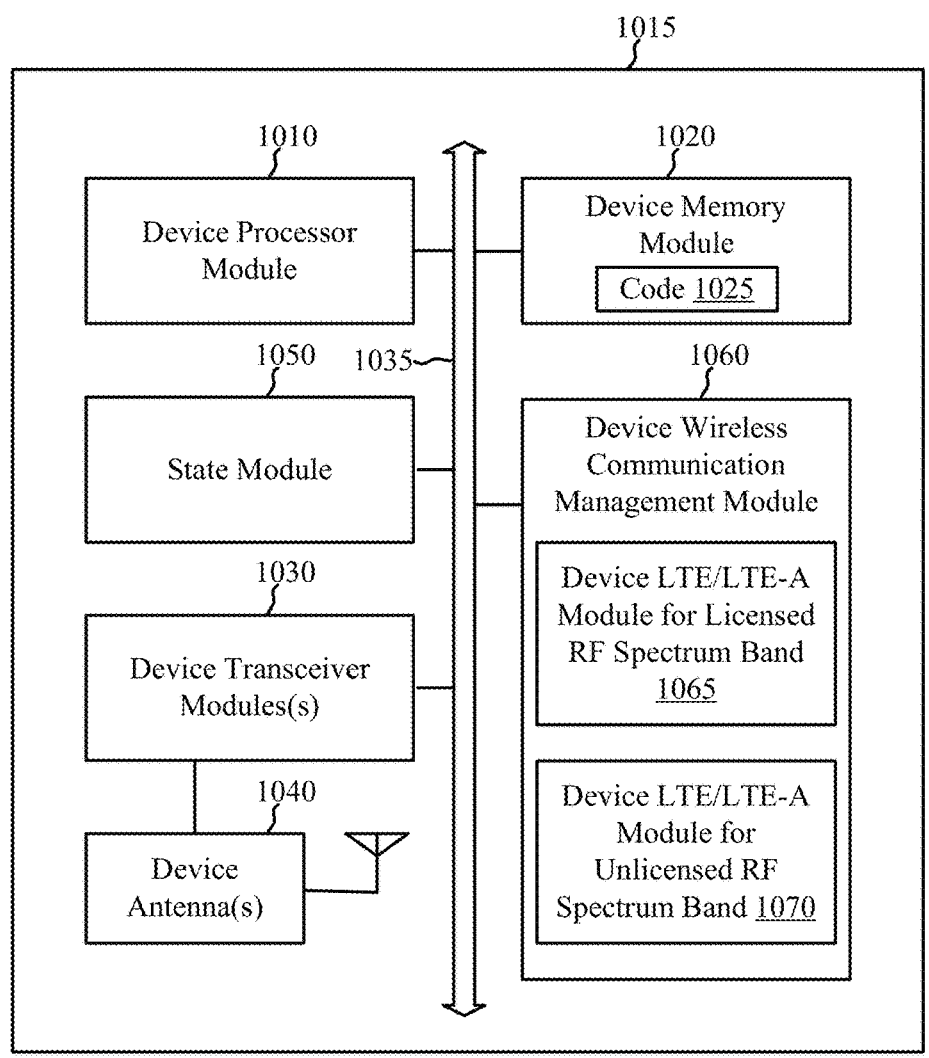
FIG. 10 shows a block diagram of a wireless device (e.g., a UE capable of communicating with one or more base stations) for use in wireless communication, in accordance with various aspects of the present disclosure.

FIG. 10 shows a block diagram 1000 of a wireless device 1015 (e.g., a UE capable of communicating with one or more base stations) for use in wireless communication, in accordance with various aspects of the present disclosure. The wireless device 1015 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The wireless device 1015 may, in some examples, have an internal power supply (not shown), such as a small battery, to facilitate mobile operation. In some examples, the wireless device 1015 may be an example of aspects of one or more of the wireless devices 115, 215, 215-*a*, 215-*b*, or 215-*c* described with reference to FIG. 1, or 2, or aspects of one or more of the apparatuses 705 or 805 described with reference to FIG. 7 or 8. The wireless device 1015 may be configured to implement at least some of the wireless device features and functions described with reference to FIG. 1, 2, 3, 4, 5, 6, 7, 8, 9, or 10.

The wireless device 1015 may include a device processor module 1010, a device memory module 1020, at least one device transceiver module (represented by device transceiver module(s) 1030), at least one device antenna (represented by device antenna(s) 1040), or a device wireless communication management module 1060. Each of these components may be in communication with each other, directly or indirectly, over one or more buses 1035.

The device memory module 1020 may include random access memory (RAM) or read-only memory (ROM). The device memory module 1020 may store computer-readable, computer-executable code 1025 containing instructions that are configured to, when executed, cause the device processor module 1010 to perform various functions described herein related to wireless communication, including, for example, the cell discovery and related determination of cell parameters. Alternatively, the code 1025 may not be directly executable by the device processor module 1010 but be configured to cause the wireless device 1015 (e.g., when compiled and executed) to perform various of the functions described herein.

The device processor module 1010 may include an intelligent hardware device (e.g., a CPU, a microcontroller, an ASIC, etc.). The device processor module 1010 may process information received through the device transceiver module(s) 1030 or information to be sent to the device transceiver module(s) 1030 for transmission through the device antenna(s) 1040. The device processor module 1010 may handle, alone or in connection with the device wireless communication management module 1060, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., an unlicensed radio frequency spectrum band for which apparatuses may contend for access because the radio frequency spectrum band is available for unlicensed use, such as Wi-Fi use).

The device transceiver module(s) 1030 may include a modem configured to modulate packets and provide the modulated packets to the device antenna(s) 1040 for transmission, and to demodulate packets received from the device antenna(s) 1040. The device transceiver module(s) 1030 may, in some examples, be implemented as one or more device transmitter modules and one or more separate device receiver modules. The device transceiver module(s) 1030 may support communications in the first radio frequency spectrum band or the second radio frequency spectrum band. The device transceiver module(s) 1030 may be configured to communicate bi-directionally, via the device antenna(s) 1040, with one or more of the base stations 105, 205, or 205-*a* described with reference to FIG. 1, or 2. While the wireless device 1015 may include a single device antenna, there may be examples in which the wireless device 1015 may include multiple device antennas 1040.

The device state module 1050 may be used, for example, to manage transitions of the wireless device 1015 between a radio resource control (RRC) idle state and an RRC connected state, and may be in communication with other components of the wireless device 1015, directly or indirectly, over the one or more buses 1035. The device state module 1050, or portions of it, may include a processor, or some or all of the functions of the device state module 1050 may be performed by the device processor module 1010 or in connection with the device processor module 1010.

The device wireless communication management module 1060 may be configured to perform or control some or all of the features or functions described with reference to FIG. 1, 2, 3, 4, 5, 6, 7, 8, or 9 related to wireless communication over the first radio frequency spectrum band or the second radio frequency spectrum band. For example, the device wireless communication management module 1060 may be configured to support a supplemental downlink mode, a carrier aggregation mode, or a standalone mode using the first radio frequency spectrum band or the second radio frequency spectrum band. The device wireless communication management module 1060 may include a device LTE/LTE-A module for licensed radio frequency spectrum band 1065, configured to handle LTE/LTE-A communications in the first radio frequency spectrum band, and a device LTE/LTE-A module for unlicensed radio frequency spectrum band 1070, configured to handle LTE/LTE-A communications in the second radio frequency spectrum band. The device wireless communication management module 1060, or portions of it, may include a processor, or some or all of the functions of the device wireless communication management module 1060 may be performed by the device processor module 1010 or in connection with the device processor module 1010. In some examples, the device wireless communication management module 1060 may be an example of the wireless communications management module 720 or 820 described with reference to FIG. 7 or 8.

Figure 11:
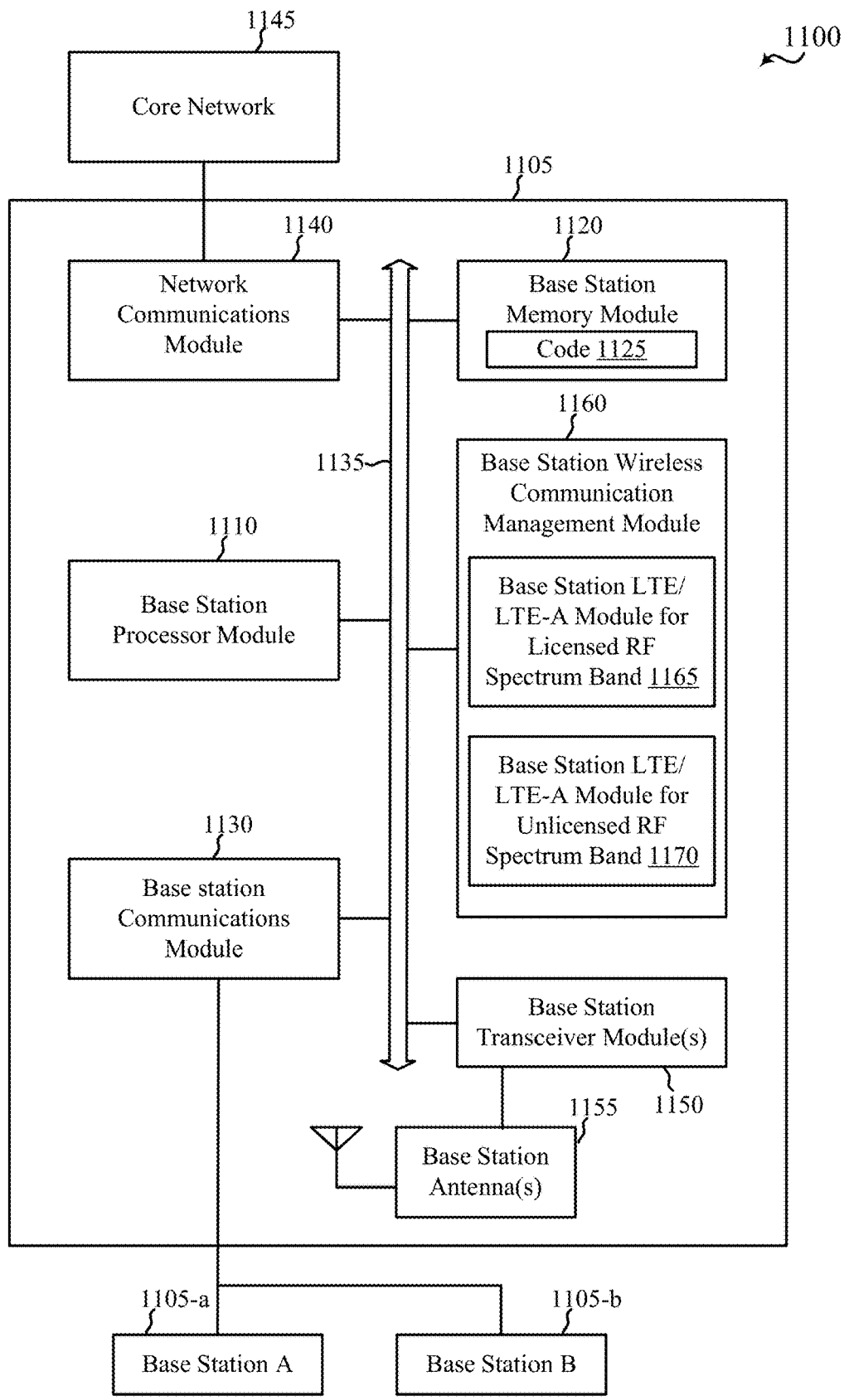
FIG. 11 shows a block diagram of a base station (e.g., a base station forming part or all of an eNB) for use in wireless communication, in accordance with various aspects of the present disclosure.

FIG. 11 shows a block diagram 1100 of a base station 1105 (e.g., a base station forming part or all of an eNB) for use in wireless communication, in accordance with various aspects of the present disclosure. In some examples, the base station 1105 may be an example of one or more aspects of the base station 105, 205, 205-*a*, or 905 described with reference to FIG. 1, 2, or 9. The base station 1105 may be configured to implement or facilitate at least some of the base station features and functions described with reference to FIG. 1, 2, 3, 4, 5, 6, 7, 8, or 9.

The base station 1105 may include a base station processor module 1110, a base station memory module 1120, at least one base station transceiver module (represented by base station transceiver module(s) 1150), at least one base station antenna (represented by base station antenna(s) 1155), or a base station wireless communication management module 1160. The base station 1105 may also include one or more of a base station communications module 1130 or a network communications module 1140. Each of these components may be in communication with each other, directly or indirectly, over one or more buses 1135.

The base station memory module 1120 may include RAM or ROM. The base station memory module 1120 may store computer-readable, computer-executable code 1125 containing instructions that are configured to, when executed, cause the base station processor module 1110 to perform various functions described herein related to wireless communication, including, for example, the CET and non-CET transmissions. Alternatively, the code 1125 may not be directly executable by the base station processor module 1110 but be configured to cause the base station 1105 (e.g., when compiled and executed) to perform various of the functions described herein.

The base station processor module 1110 may include an intelligent hardware device (e.g., a central processing unit (CPU), a microcontroller, an ASIC, etc.). The base station processor module 1110 may process information received through the base station transceiver module(s) 1150, the base station communications module 1130, or the network communications module 1140. The base station processor module 1110 may also process information to be sent to the transceiver module(s) 1150 for transmission through the antenna(s) 1155, to the base station communications module 1130, for transmission to one or more other base stations 1105-*a* and 1105-*b*, or to the network communications module 1140 for transmission to a core network 1145, which may be an example of one or more aspects of the core network 130 described with reference to FIG. 1. The base station processor module 1110 may handle, alone or in connection with the base station wireless communication management module 1160, various aspects of communicating over (or managing communications over) a first radio frequency spectrum band (e.g., a licensed radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., an unlicensed radio frequency spectrum band for which apparatuses may contend for access because the radio frequency spectrum band is available for unlicensed use, such as Wi-Fi use).

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may support communications in the first radio frequency spectrum band or the second radio frequency spectrum band. The base station transceiver module(s) 1150 may be configured to communicate bi-directionally, via the antenna(s) 1155, with one or more wireless devices or apparatuses, such as one or more of the wireless devices 115, 215, 215-a, 215-b, 215-c, or 1015 described with reference to FIG. 1, 2, or 10, or one or more of the apparatuses 705 or 805 described with reference to FIG. 7 or 8. The base station 1105 may, for example, include multiple base station antennas 1155 (e.g., an antenna array). The base station 1105 may communicate with the core network 1145 through the network communications module 1140. The base station 1105 may also communicate with other base stations, such as the base stations 1105-a and 1105-b, using the base station communications module 1130.

The base station wireless communication management module 1160 may be configured to perform or control some or all of the features or functions described with reference to FIG. 1, 2, 3, 4, 5, 6, 7, 8, or 9 related to CET and non-CET operations for transmitting information for use in cell discovery. The base station wireless communication management module 1160 may include a base station LTE/LTE-A module for licensed radio frequency spectrum band 1165, configured to handle LTE/LTE-A communications in the first radio frequency spectrum band, or a base station LTE/LTE-A module for unlicensed radio frequency spectrum band 1170, configured to handle LTE/LTE-A communications in the second radio frequency spectrum band. The base station wireless communication management module 1160, or portions of it, may include a processor, or some or all of the functions of the base station wireless communication management module 1160 may be performed by the base station processor module 1110 or in connection with the base station processor module 1110.

Figure 12:
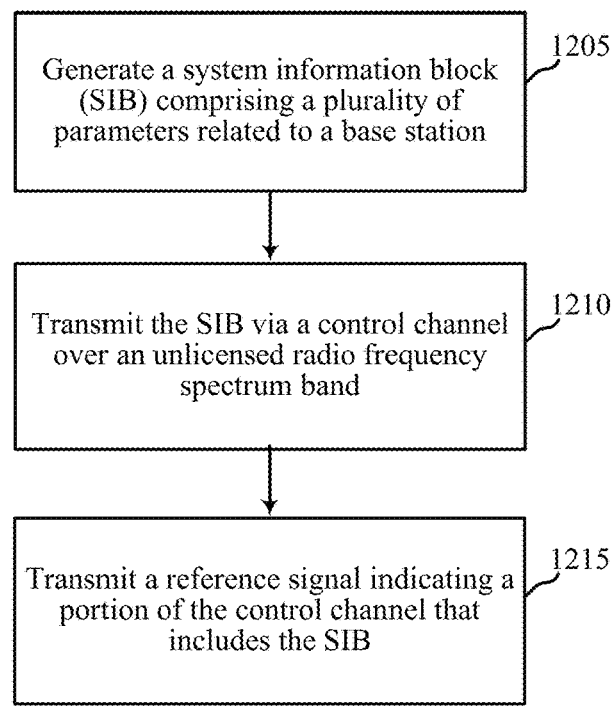
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105, 205, 205-a, 905, or 1105, described with reference to FIG. 1, 2, 9, or 11, or aspects of one or more of the apparatuses 705 or 805 described with reference to FIG. 7, or 8. In some examples a wireless device may execute one or more sets of codes to control the functional elements of the wireless device to perform the functions described below.

At block 1205, the method 1200 may include generating a system information block (SIB) comprising a plurality of parameters related to a base station. The operation(s) at block 1205 may be performed using the wireless communications management module 720, 820, 920, or 1160 described with reference to FIG. 7, 8, 9, or 11, or the eSIB module 735, 835, or 940 described with reference to FIG. 7, 8, or 9.

At block 1210, the method 1200 may include transmitting the SIB via a control channel over an unlicensed radio frequency spectrum band. The operation(s) at block 1210 may be performed using the wireless communications management module 720, 820, 920, or 1160 described with reference to FIG. 7, 8, 9, or 11, the transmitter module 730, 830, or 930 described with reference to FIG. 7, 8, or 9, or the base station transceiver module 1150 and base station antennas 1155 described with reference to FIG. 11.

At block 1215, the method 1200 may include transmitting a reference signal indicating a portion of the control channel that includes the SIB. The operation(s) at block 1215 may be performed using the wireless communications management module 720, 820, 920, or 1160 described with reference to FIG. 7, 8, 9, or 11, the transmitter module 730, 830, or 930 described with reference to FIG. 7, 8, or 9, or the base station transceiver module 1150 and base station antennas 1155 described with reference to FIG. 11.

Thus, the method 1200 may provide for wireless communication. It should be noted that the method 1200 is just one implementation and that the operations of the method 1200 may be rearranged or otherwise modified such that other implementations are possible.

Figure 13:
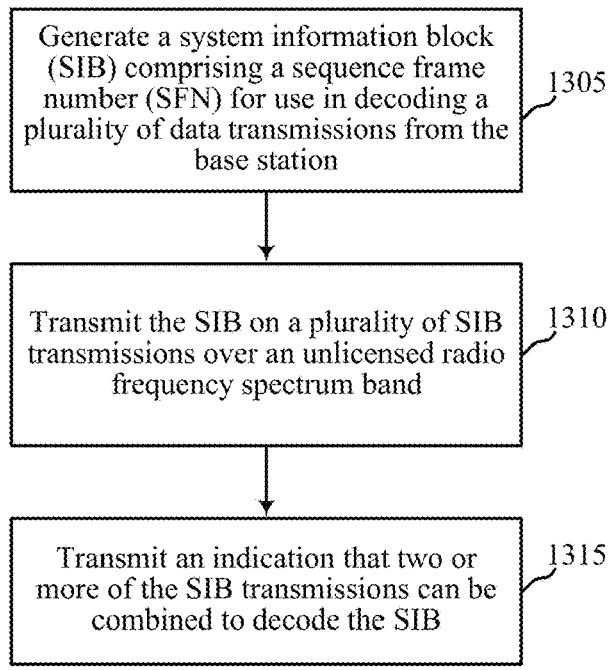
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105, 205, 205-a, 905, or 1105, described with reference to FIG. 1, 2, 9, or 11, or aspects of one or more of the apparatuses 705, or 805 described with reference to FIG. 7, or 8. In some examples a wireless device may execute one or more sets of codes to control the functional elements of the wireless device to perform the functions described below.

At block 1305, the method 1300 may include generating a system information block (SIB) comprising a sequence frame number (SFN) for use in decoding a plurality of data transmissions from the base station. The operation(s) at block 1305 may be performed using the wireless communications management module 720, 820, 920, or 1160 described with reference to FIG. 7, 8, 9, or 11, or the SFN timing module 740, 840, or 935 described with reference to FIG. 7, 8, or 9.

At block 1310, the method 1300 may include transmitting the SIB on a plurality of SIB transmissions over an unlicensed radio frequency spectrum band. The operation(s) at block 1310 may be performed using the wireless communications management module 720, 820, 920, or 1160 described with reference to FIG. 7, 8, 9, or 11, the transmitter module 730, 830, or 930 described with reference to FIG. 7, 8, or 9, or the base station transceiver module 1150 and base station antennas 1155 described with reference to FIG. 11.

At block 1315, the method 1300 may include transmitting an indication that two or more of the SIB transmissions can be combined to decode the SIB. The operation(s) at block 1315 may be performed using the wireless communications management module 720, 820, 920, or 1160 described with reference to FIG. 7, 8, 9, or 11, the transmitter module 730, 830, or 930 described with reference to FIG. 7, 8, or 9, or the base station transceiver module 1150 and base station antennas 1155 described with reference to FIG. 11.

Thus, the method 1300 may provide for wireless communication. It should be noted that the method 1300 is just one implementation and that the operations of the method 1300 may be rearranged or otherwise modified such that other implementations are possible.

Figure 14:
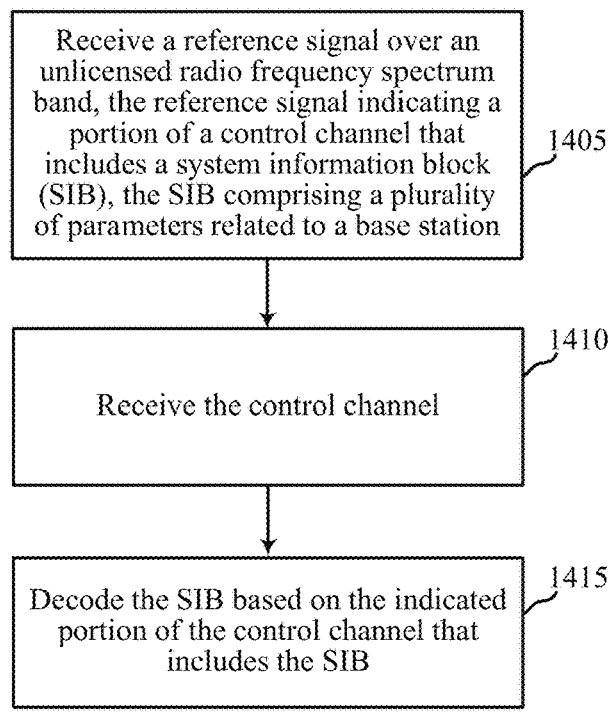
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the wireless devices 115, 215, 215-*a*, 215-*b*, 215-*c*, or 1005, described with reference to FIG. 1, 2, or 10, or aspects of one or more of the apparatuses 705, or 805 described with reference to FIG. 7, or 8. In some examples a wireless device may execute one or more sets of codes to control the functional elements of the wireless device to perform the functions described below.

At block 1405, the method 1400 may include receiving a reference signal over an unlicensed radio frequency spectrum band, the reference signal indicating a portion of a control channel that includes a system information block (SIB), the SIB comprising a plurality of parameters related to a base station. The operation(s) at block 1405 may be performed using the wireless communications management module 720, 820, or 1060 described with reference to FIG. 7, 8, or 10, the receiver module 710, or 810 described with reference to FIG. 7, or 8, or the device transceiver module(s) 1030 and device antenna(s) 1040 described with reference to FIG. 10.

At block 1410, the method 1400 may include receiving the control channel. The operation(s) at block 1405 may be performed using the wireless communications management module 720, 820, or 1060 described with reference to FIG. 7, 8, or 10, the receiver module 710, or 810 described with reference to FIG. 7, or 8, or the device transceiver module(s) 1030 and device antenna(s) 1040 described with reference to FIG. 10.

At block 1415, the method 1400 may include decoding the SIB based on the indicated portion of the control channel that includes the SIB. The operation(s) at block 1405 may be performed using the wireless communications management module 720, 820, or 1060 described with reference to FIG. 7, 8, or 10.

Thus, the method 1400 may provide for wireless communication. It should be noted that the method 1400 is just one implementation and that the operations of the method 1400 may be rearranged or otherwise modified such that other implementations are possible.

Figure 15:
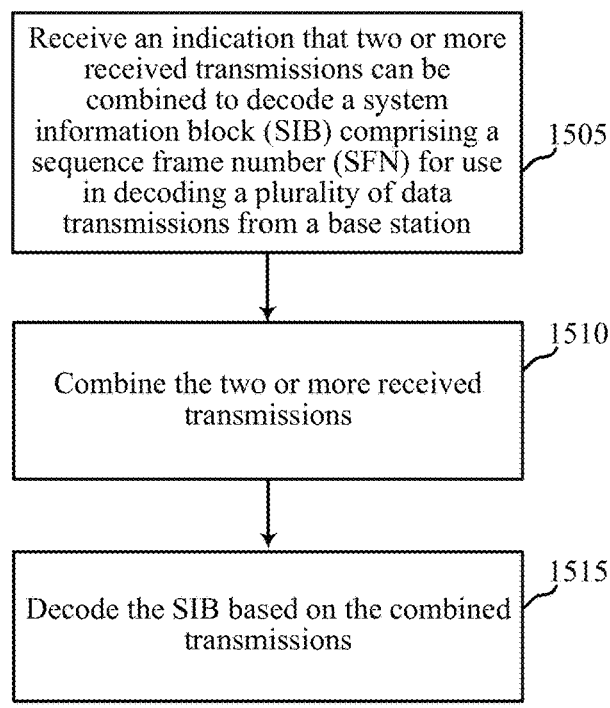
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the wireless devices 115, 215, 215-*a*, 215-*b*, 215-*c*, or 1005, described with reference to FIG. 1, 2, or 10, or aspects of one or more of the apparatuses 705, or 805 described with reference to FIG. 7, or 8. In some examples a wireless device may execute one or more sets of codes to control the functional elements of the wireless device to perform the functions described below.

At block 1505, the method 1500 may include receiving an indication that two or more received transmissions can be combined to decode a system information block (SIB) comprising a sequence frame number (SFN) for use in decoding a plurality of data transmissions from a base station. The operation(s) at block 1505 may be performed using the wireless communications management module 720, 820, or 1060 described with reference to FIG. 7, 8, or 10, the receiver module 710, or 810 described with reference to FIG. 7, or 8, or the device transceiver module(s) 1030 and device antenna(s) 1040 described with reference to FIG. 10.

At block 1510, the method 1500 may include combining the two or more received transmissions. The operation(s) at block 1505 may be performed using the wireless communications management module 720, 820, or 1060 described with reference to FIG. 7, 8, or 10.

At block 1515, the method 1500 may include decoding the SIB based on the combined transmissions. The operation(s) at block 1505 may be performed using the wireless communications management module 720, 820, or 1060 described with reference to FIG. 7, 8, or 10.

Thus, the method 1500 may provide for wireless communication. It should be noted that the method 1500 is just one implementation and that the operations of the method 1500 may be rearranged or otherwise modified such that other implementations are possible.

In some examples, aspects of one or more of the methods 1200, 1300, 1400, or 1500 described with reference to FIG. 12, 13, 14, or 15 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
   generating a system information block (SIB) comprising a plurality of parameters related to a base station, wherein the plurality of parameters comprise a system frame number (SFN);
   transmitting a physical downlink control channel that is indicative of a location of a transmission of the SIB, the physical downlink control channel transmitted within a first subset of resources and over an unlicensed radio frequency spectrum band; and
   transmitting, within a second subset of resources, a reference signal with a periodicity that exceeds a length of a radio frame, wherein the periodicity corresponds to a time period for incrementing the SFN, wherein the reference signal comprises information indicating a location of the first subset of resources that includes the physical downlink control channel, wherein the second subset of resources is disjoint from the first subset of resources, wherein the SIB is transmitted in resources of the unlicensed radio frequency spectrum band, wherein the transmission of the SIB is one of a plurality of transmissions of the SIB included in a plurality of resource blocks, and wherein the plurality of resource blocks are combinable and the combined plurality of resource blocks are decodable to obtain the SIB.

2. The method of claim 1, wherein the first subset of resources comprises a plurality of resource blocks, and wherein the information indicates a location of one or more resource blocks of the plurality of resource blocks.

3. The method of claim 2, wherein the reference signal comprises a physical cell identity (PCI), and wherein the one or more resource blocks are mapped to the PCI.

4. The method of claim 2, wherein the one or more resource blocks are predetermined based on a timing of the reference signal.

5. The method of claim 1, wherein the SIB is transmitted over the unlicensed radio frequency spectrum band during a clear channel assessment (CCA)-exempt transmission (CET) subframe associated with the base station.

6. The method of claim 1, further comprising:
   performing a clear channel assessment (CCA) prior to a non-CCA-exempt transmission (non-CET) subframe associated with opportunistic system information block transmissions; and
   transmitting the SIB on the non-CET subframe when the CCA is successful.

7. The method of claim 1, wherein the physical downlink control channel comprises an evolved physical downlink control channel (ePDCCH), the reference signal comprises an evolved cell specific reference signal (eCRS), and the SIB comprises an evolved SIB (eSIB).

8. The method of claim 1, wherein the information included in the reference signal comprises decodable information, and wherein the decodable information included in the reference signal is decodable to obtain one or more bits that indicate the location of the first subset of resources including the physical downlink control channel.

9. A method of wireless communication, comprising:
   receiving a reference signal over a first subset of resources of an unlicensed radio frequency spectrum band, the reference signal comprising information indicating a location of a second subset of resources that includes a physical downlink control channel, wherein the first subset of resources is disjoint from the second subset of resources, and wherein the reference signal is received with a periodicity that exceeds a length of a radio frame, the periodicity corresponding to a time period for incrementing a system frame number (SFN);
   receiving, within the second subset of resources of the unlicensed radio frequency spectrum band, the physical downlink control channel based at least in part on mapping the information included in the reference signal to the location of the second subset of resources of the unlicensed radio frequency spectrum band, wherein the physical downlink control channel is indicative of a location of a transmission of a system information block (SIB); and
   decoding the SIB based at least in part on the physical downlink control channel that is indicative of the location of the transmission of the SIB, wherein the SIB is received in resources of the unlicensed radio frequency spectrum band and the SIB comprises a plurality of parameters related to a base station, wherein the plurality of parameters comprise the SFN, and wherein the decoding comprises:
combining a plurality of resource blocks including a plurality of transmissions of the SIB, the transmission of the SIB being one of the plurality of transmissions of the SIB; and
decoding the combined plurality of resource blocks to obtain the SIB.

10. The method of claim 9, wherein the second subset of resources comprises a plurality of resource blocks, and wherein the information indicates a location of one or more resource blocks of the plurality of resource blocks.

11. The method of claim 10, wherein the information comprises a physical cell identity (PCI), and wherein the second subset of the plurality of resource blocks are mapped to the PCI.

12. The method of claim 9, wherein the information included in the reference signal comprises decodable information, the method further comprising:
decoding the decodable information included in the reference signal to obtain one or more bits that indicate the location of the second subset of resources including the physical downlink control channel.

13. An apparatus for wireless communication, comprising:
a processor; and
memory coupled to the processor, wherein the processor is configured to:
generate a system information block (SIB) comprising a plurality of parameters related to a base station, wherein the plurality of parameters comprise a system frame number (SFN);
transmit a physical downlink control channel that is indicative of a location of a transmission of the SIB, the physical downlink control channel transmitted within a first subset of resources and over an unlicensed radio frequency spectrum band; and
transmit, within a second subset of resources, a reference signal with a periodicity that exceeds a length of a radio frame, wherein the periodicity corresponds to a time period for incrementing the SFN, wherein the reference signal comprises information indicating a location of the first subset of resources that includes the physical downlink control channel, wherein the second subset of resources is disjoint from the first subset of resources wherein the SIB is transmitted in resources of the unlicensed radio frequency spectrum band, wherein the transmission of the SIB is one of a plurality of transmissions of the SIB included in a plurality of resource blocks, and wherein the plurality of resource blocks are combinable and the combined plurality of resource blocks are decodable to obtain the SIB.

14. The apparatus of claim 13, wherein the first subset of resources comprises a plurality of resource blocks, and wherein the information indicates a location of one or more resource blocks of the plurality of resource blocks.

15. The apparatus of claim 14, wherein the reference signal comprises a physical cell identity (PCI), and wherein the one or more resource blocks are mapped to the PCI.

16. The apparatus of claim 14, wherein the one or more resource blocks are predetermined based on a timing of the reference signal.

17. The apparatus of claim 13, wherein the SIB is transmitted over the unlicensed radio frequency spectrum band during a clear channel assessment (CCA)-exempt transmission (CET) subframe associated with the base station.

18. The apparatus of claim 13, wherein the processor is further configured to:
perform a clear channel assessment (CCA) prior to a non-CCA-exempt transmission (non-CET) subframe associated with opportunistic system information block transmissions; and
transmit the SIB on the non-CET subframe when the CCA is successful.

19. An apparatus for wireless communication, comprising:
a processor; and
memory coupled to the processor, wherein the processor is configured to:
receive a reference signal over a first subset of resources of an unlicensed radio frequency spectrum band, the reference signal comprising information indicating a location of a second subset of resources that includes a physical downlink control channel, wherein the first subset of resources is disjoint from the second subset of resources, and wherein the reference signal is received with a periodicity that exceeds a length of a radio frame, the periodicity corresponding to a time period for incrementing a system frame number (SFN);
receive, within the second subset of resources of the unlicensed radio frequency spectrum band, the physical downlink control channel based at least in part on mapping the information included in the reference signal to the location of the second subset of resources of the unlicensed radio frequency spectrum band, wherein the physical downlink control channel is indicative of a location a transmission of a system information block (SIB); and
decode the SIB based at least in part on the physical downlink control channel that is indicative of the location of the transmission of the SIB, wherein the SIB is received in resources of the unlicensed radio frequency spectrum band and the SIB comprises a plurality of parameters related to a base station, wherein the plurality of parameters comprise the SFN, and wherein the processor is further configured to:
combine a plurality of resource blocks including a plurality of transmissions of the SIB, the transmission of the SIB being one of the plurality of transmissions of the SIB; and
decode the combined plurality of resource blocks to obtain the SIB.

20. The apparatus of claim 19, wherein the information indicates a subset of a plurality of resource blocks comprising the physical downlink control channel indicative of the location of the SIB.

21. The apparatus of claim 20, wherein the information comprises a physical cell identity (PCI), and wherein the second subset of the plurality of resource blocks are mapped to the PCI.

22. The apparatus of claim 20, wherein the information indicates a location one or more resource blocks of the subset of resource blocks.

\* \* \* \* \*